United States Patent
Rune et al.

(10) Patent No.: US 9,736,882 B2
(45) Date of Patent: Aug. 15, 2017

(54) SYSTEMS AND METHODS FOR ADAPTING A DRX CONFIGURATION FOR A RAN BASED ON A PREFERRED DRX CONFIGURATION OF AN ASSOCIATED CAPILLARY NETWORK

(71) Applicant: Telefonaktiebolaget LM Ericsson (publ), Stockholm (SE)

(72) Inventors: Johan Rune, Lidingö (SE); Vlasios Tsiatsis, Solna (SE); Ari Keränen, Helsinki (FI); Anders E. Eriksson, Kista (SE); Francesco Militano, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/110,870

(22) PCT Filed: Jan. 16, 2014

(86) PCT No.: PCT/SE2014/050048
§ 371 (c)(1),
(2) Date: Jul. 11, 2016

(87) PCT Pub. No.: WO2015/108455
PCT Pub. Date: Jul. 23, 2015

(65) Prior Publication Data
US 2016/0338142 A1    Nov. 17, 2016

(51) Int. Cl.
*H04W 4/00* (2009.01)
*H04W 76/04* (2009.01)
*H04W 88/16* (2009.01)

(52) U.S. Cl.
CPC ......... *H04W 76/048* (2013.01); *H04W 4/005* (2013.01); *H04W 88/16* (2013.01)

(58) Field of Classification Search
None
See application file for complete search history.

(56) References Cited

U.S. PATENT DOCUMENTS

| 2008/0285509 A1* | 11/2008 | Womack | H04W 76/048 |
| | | | 370/329 |
| 2009/0180414 A1* | 7/2009 | Maeda | H04W 52/028 |
| | | | 370/311 |

(Continued)

FOREIGN PATENT DOCUMENTS

WO    2012052598 A1    4/2012

OTHER PUBLICATIONS

Author Unknown, "Technical Specification Group Services and System Aspects; Architecture enhancements to facilitate communications with packet data networks and applications (Release 11)," Technical Specification 23.682, Version 11.3.0, 3GPP Organizational Partners, Dec. 2012, 29 pages.

(Continued)

*Primary Examiner* — Idowu O Osifade
(74) *Attorney, Agent, or Firm* — Withrow & Terranova, PLLC

(57) ABSTRACT

The disclosure provides for acquiring information related to a DRX configuration that is preferred by a Capillary Network Gateway (CGW) for a capillary network and selecting a DRX configuration, based on the acquired information, to be applied by a Radio Access Network (RAN) node to substantially match said preferred DRX configuration. The selected DRX configuration can be signaled to the gateway such that the gateway can adapt, or configure, its DRX configuration accordingly. Also, the selected DRX configuration is applied, or otherwise utilized, by the RAN node. This way, also the RAN node applies the DRX configuration that is preferred by the gateway for the capillary network. Hereby it is made possible to achieve a sufficient synchro- (Continued)

nization of the DRX configurations utilized by the gateway and the RAN node, respectively. Consequently, this may allow for a synchronization of the DRX configurations of the capillary network and a 3GPP network.

31 Claims, 12 Drawing Sheets

(56) References Cited

U.S. PATENT DOCUMENTS

| | | | | |
|---|---|---|---|---|
| 2012/0082077 | A1* | 4/2012 | Zhang | H04W 72/1215 370/311 |
| 2012/0252517 | A1 | 10/2012 | Karampatsis et al. | |
| 2013/0044659 | A1 | 2/2013 | Jokimies et al. | |
| 2013/0044661 | A1* | 2/2013 | Jokimies | H04W 52/0219 370/311 |
| 2013/0155954 | A1* | 6/2013 | Wang | H04W 4/005 370/328 |

OTHER PUBLICATIONS

Author Unknown, "Technical Specification Group Radio Access Network; Evolved Universal Terrestrial Radio Access (E-UTRA); Medium Access Control (MAC) protocol specification (Release 11)," Technical Specification 36.321, Version 11.3.0, 3GPP Organizational Partners, Jun. 2013, 57 pages.

Singh, Shubhranshu, et al., "An Energy-Efficient Scheme for WiFi-capable M2M Devices in Hybrid LTE Network," IEEE International Conference on Advanced Networks and Telecommuncations Systems (ANTS), Dec. 16-19, 2012, Bangalore, India, IEEE, pp. 126-130.

International Search Report and Written Opinion for International Patent Application No. PCT/SE2014/050048, mailed Nov. 18, 2014, 11 pages.

* cited by examiner

US 9,736,882 B2

1

SYSTEMS AND METHODS FOR ADAPTING A DRX CONFIGURATION FOR A RAN BASED ON A PREFERRED DRX CONFIGURATION OF AN ASSOCIATED CAPILLARY NETWORK

This application is a 35 U.S.C. §371 national phase filing of International Application No. PCT/SE2014/050048, filed Jan. 16, 2014, the disclosure of which is incorporated herein by reference in its entirety.

TECHNICAL FIELD

Embodiments presented herein generally relate to communication. More particularly, the embodiments presented herein relate to one or several communication devices that are communicatively connectable to a radio access network (RAN) node via a gateway of a capillary network.

BACKGROUND

Radio communication networks are widely deployed to provide various communication services such as telephony, video, data, messaging, broadcasts, and so on. Such communication networks generally support communications for multiple user equipments (UEs) by sharing available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as Universal Terrestrial Radio Access Network (UTRAN). The UMTS, which is the successor to Global System for Mobile Communications (GSM) technologies, supports various air interface standards, such as Wideband Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, UMTS based on WCDMA has been deployed in many places around the world. To ensure that this system remains competitive in the future, 3GPP began a project to define the long-term evolution of UMTS cellular technology. The specifications related to this effort are formally known as Evolved UMTS Terrestrial Radio Access (EUTRA) and Evolved UMTS Terrestrial Radio Access Network (EUTRAN), but are more commonly referred to by the name Long Term Evolution (LTE). The corresponding specifications for the core network side are commonly referred to as System Architecture Evolution (SAE) or Evolved Packet Core (EPC) (where EPC according to the most common definition is a subset of SAE). Together, SAE and LTE/EUTRAN form a complete cellular system referred to as Evolved Packet System (EPS).

A currently popular vision of the future development of the communication in radio communication networks comprises huge numbers of relatively small autonomous devices, which typically, more or less infrequently (e.g. once per week to once per minute) transmit and receive only small amounts of data (or, alternatively, are polled for data). These devices are typically not assumed to be associated with humans, but are rather sensors or actuators of different kinds, which communicate with application servers (which configure the devices and receive data from them) within or outside the cellular radio network. Hence, this type of communication is often referred to as machine-to-machine (M2M) communication and the above-mentioned devices may be denoted communication devices (CDs), or machine device (MDs). In the 3GPP standardization, the corresponding alternative terms are machine type communication (MTC) and machine type communication devices (MTC devices), with the latter being a subset of the more general term UE. FIG. 1 illustrates a 3GPP reference network architecture for MTC, which can be found in 3GPP TS 23.682 V.11.3.0.

With the nature of MTC devices and their assumed typical uses follow that these devices will often have to be relatively energy efficient, since external power supplies will often not be available. Also, it is neither practically nor economically feasible to frequently replace or recharge their batteries. In some scenarios, the MTC devices may not even be battery powered, but may instead rely on energy harvesting, e.g. gathering energy from the environment, that is, utilizing (the often limited) energy that may be tapped from sun light, temperature gradients, vibrations, etc.

A mechanism that has been introduced in 3GPP networks to conserve UE energy is Discontinuous Reception (DRX), which has been specified for both idle and connected mode. This mechanism allows a UE to spend most of the time in an energy efficient low power mode, often called sleep mode, while waking up to listen for pages in idle mode DRX or downlink resource assignments (i.e. downlink transmissions) in connected mode DRX only on specific occasions.

A DRX cycle generally comprises of a sleep period followed by an active period (although the occasions when the UE listens for pages in idle mode DRX are sometimes not referred to as "active periods" but rather "paging occasions") and this cycle is generally repeated until the device is detached from the network or switches (in either direction) between idle and connected mode. Typically, but not necessarily, the sleep period is longer than the active period. A DRX cycle may have a more complex structure than described above, but for the purpose of this disclosure, the simplified DRX cycle description suffices (see e.g. chapter 5.7 of 3GPP TS 36.321 V11.3.0 for details on the connected mode DRX in LTE). Currently the maximum DRX cycle length for both idle mode DRX and connected mode DRX is 2.56 seconds (i.e. 256 subframes of one millisecond each). However, in order to make the DRX mechanism even more effective for energy deprived MTC devices, 3GPP is considering extending the maximum DRX cycle length, and thus the sleep period, both for idle mode DRX and connected mode DRX, leveraging the delay tolerance and infrequent communication need of many MTC applications. As the term Discontinuous Reception implies, it concerns only the downlink, whereas a UE may initiate communication in the uplink at any time, irrespective of the DRX cycle.

SUMMARY

It is in view of the above considerations and others that the various embodiments disclosed herein have been made. So far the MTC related work in 3GPP has focused on MTC devices directly connected to the cellular network via the radio interface of the cellular network. However, the inventors have realized that a scenario which is likely to be more prevalent in the future is that most MTC devices connect to the cellular network via a gateway. In such scenarios, the gateway will act like a UE towards the cellular radio communication network while maintaining a local network, e.g. based on a short range radio technology towards the CDs of the capillary network. Such a local network, which in a sense extends the reach of the cellular radio communication network (to other radio technologies but typically not in terms of radio coverage) may be referred to as a capillary network and the gateway connecting the capillary network to the cellular radio communication network may be referred to as a capillary network gateway (CGW). The capillary network principle is illustrated in FIG. 2. The capillary network can thus be seen as a network (fixed or cellular) which can provide a communication link between a radio access network (RAN) and the communication devices (CDs) of the capillary network. Typically, but not necessarily, the capillary network is a non-3GPP network, whereas the RAN belongs to a 3GPP network.

Radio technologies that are expected to be common in capillary networks include e.g. IEEE 802.15.4 (e.g. with 6LoWPAN or ZigBee), Bluetooth or various versions of the IEEE 802.11 family (e.g. WiFi). The capillary network technologies (e.g. the radio technologies mentioned above) also comprise their respective energy saving mechanisms, which essentially have a similar effect as the DRX mechanism of the 3GPP networks, i.e. that the CDs are relieved from monitoring downlink transmissions most of the time, while only brief periodic monitoring is required. There is even similar energy saving mechanisms that may be applied to the CGW. There are also means for the CGW to control the DRX cycles of the devices in the capillary network.

The DRX energy saving principle is inherently a tradeoff between energy saving and delay. The maximum length of a DRX cycle is limited by the maximum acceptable delay, such that the maximum DRX cycle length must not incur a delay that is greater than the maximum acceptable delay (depending on the application requirements). The actual delay depends on, among other things, which point in the DRX cycle data is queued for transmission. Hence, the actual delay caused by DRX may vary between zero and the full inactive (i.e. sleep) period of the DRX cycle.

Although both types of radio interfaces involved in a capillary network scenario, i.e. the 3GPP (e.g. LTE) radio interface and the capillary network radio interface, allow for employment of energy saving DRX mechanisms, they do not perform optimally together. A reason for this is the above mentioned tradeoff between energy saving and delay, which is inherent in the DRX principle. When DRX is utilized on two sequential links of a transmission path the incurred delays are added, i.e. the average delays as well as the maximum delays are added. Because of the tradeoff between energy saving and delay, the increased delay inevitably means that the maximum acceptable DRX cycle length, and thus the achieved energy saving, has to be reduced.

It is therefore a general object of the embodiments presented herein to provide for a more efficient, and thus improved, usage of the DRX mechanism in capillary network scenarios.

According to an aspect, there is provided a method performed by a Radio Access Network (RAN) node of a radio communication network. The RAN node may e.g. be an evolved NodeB (eNB). One or several communication devices (CDs), such as MTC devices, are communicatively connectable to the RAN node via a gateway of a capillary network. Information related to a Discontinuous Reception (DRX) configuration that is preferred by the gateway for the capillary network is acquired. As used throughout this disclosure the phrase "preferred by the gateway for the capillary network" should be understood to mean "preferred by the gateway on its capillary network interface". Based on this acquired information a DRX configuration to be applied by the RAN node is selected, or chosen. The DRX configuration is selected to substantially match the DRX configuration that is preferred by the gateway for the capillary network. Subsequently, a configuration message including the selected DRX configuration for thereby configuring the gateway is transmitted to the gateway. Furthermore, the selected DRX configuration is applied, or otherwise utilized, by the RAN node.

Acquiring information related to the DRX configuration that is preferred by the gateway for the capillary network may comprise receiving a message including the information related to the DRX configuration that is preferred by the gateway for the capillary network from a Core Network (CN) node. For example, the CN node may be a Mobility Management Entity (MME).

Alternatively, acquiring information related to the DRX configuration that is preferred by the gateway for the capillary network may comprise receiving a message including the information related to the DRX configuration that is preferred by the gateway (for the capillary network) from the gateway, i.e. from the gateway itself. The gateway may be referred to as a Capillary Network Gateway (CGW).

In some embodiments, the method further comprises comparing a DRX configuration currently utilized by the RAN node with the DRX configuration that is preferred by the gateway for the capillary network in order to identify whether there is any mismatch between active time periods of the respective DRX configurations. In response to identifying a mismatch between the active time periods of the respective DRX configurations the method may also comprise compensating for the identified mismatch.

In some embodiments, the method may comprise comparing a DRX configuration currently utilized by the RAN node with the DRX configuration that is preferred by the gateway for the capillary network in order to identify whether there is any mismatch in the overlap between active time periods of the respective DRX configurations, in response to identifying a mismatch between the overlap of the active time periods of the respective DRX configurations checking whether said overlap mismatch is equal to or above an overlap mismatch threshold value, and compensating for the identified mismatch when said overlap mismatch is equal to or above the overlap mismatch threshold value.

The information related to the DRX configuration that is preferred by the gateway for the capillary network may comprise one or more of the following: information about the time length of the DRX cycle, information about the division (or, split) into active and inactive periods of the DRX cycle.

According to another aspect, there is provided a method performed by a gateway of a capillary network. One or several communication devices, such as MTC devices, are communicatively connectable to a RAN node (such as an eNB) of a radio communication network via the gateway. The method comprises receiving, from the RAN node, a configuration message including a DRX configuration for configuring the gateway accordingly. The DRX configuration substantially matches a DRX configuration that is preferred by the gateway for the capillary network. Also, this DRX configuration is applied by the gateway of the capillary network.

The method may comprise transmitting, to a network node of the radio communication network, a message including information related to a DRX configuration that is preferred by the gateway for the capillary network. The network node may be a Services Capability Server (SCS). Alternatively, the network node may be the RAN node.

According to still another aspect, there is provided a Radio Access Network (RAN) node of a radio communication network for communication with a gateway of a capillary network. The RAN node may be an evolved NodeB (eNB). One or several communication devices are communicatively connectable to the RAN node via the gateway. The RAN node comprises means adapted to acquire information related to a DRX configuration that is preferred by the gateway for the capillary network. Also, the RAN node comprises means adapted to select, based on the acquired information, a DRX configuration to be applied by the RAN node to substantially match the preferred DRX configuration for the capillary network. Furthermore, the RAN node comprises means adapted to transmit a configuration message including the selected DRX configuration to the gateway for configuring the gateway accordingly. Moreover, the RAN node comprises means adapted to apply the selected DRX configuration.

In some embodiments, the means adapted to acquire information related to the DRX configuration that is preferred by the gateway for the capillary network is adapted to receive a message including said information related to the DRX configuration that is preferred by the gateway for the capillary network from a CN node. The CN node may be a MME. In some embodiments, the means adapted to acquire information related to the DRX configuration that is preferred by the gateway for the capillary network is adapted to receive a message including the information related to the DRX configuration that is preferred by the gateway for the capillary network from the gateway. The gateway may be a Capillary Network Gateway (CGW).

In some embodiments, the RAN node further comprises means adapted to compare a DRX configuration currently utilized by the RAN node with the DRX configuration that is preferred by the gateway for the capillary network in order to identify whether there is any mismatch between active time periods of the respective DRX configurations; and in response to identifying a mismatch between the active time periods of the respective DRX configurations to compensate for the identified mismatch. Also, the RAN node may comprise means adapted to compare a DRX configuration currently utilized by the RAN node with the DRX configuration that is preferred by the gateway for the capillary network in order to identify whether there is any mismatch in the overlap between active time periods of the respective DRX configurations; in response to identifying a mismatch between the overlap of the active time periods of the respective DRX configurations check whether said overlap mismatch is equal to or above an overlap mismatch threshold value; and compensate for the identified mismatch when said overlap mismatch is equal to or above the overlap mismatch threshold value.

Again, the information related to the DRX configuration that is preferred by the gateway comprises one or more of the following: information about the time length of the DRX cycle, information about the division into active and inactive periods of the DRX cycle.

According to still a further aspect, there is provided a gateway of a capillary network for communication with a RAN node of a radio communication network. One or several communication devices are communicatively connectable to the RAN node of a radio communication network via the gateway. The gateway comprises means adapted to receive, from the RAN node, a configuration message including a DRX configuration for configuring the gateway accordingly, wherein the DRX configuration substantially matches a DRX configuration preferred by the gateway for the capillary network. Also, means adapted to apply the DRX configuration are provided.

The gateway may further comprise means adapted to transmit, to a network node of the radio communication network, a message including information related to a DRX configuration that is preferred by the gateway for the capillary network.

The network node may be a Services Capability Server (SCS). Alternatively, the network node may be the RAN node. The RAN node may be an eNB.

According to still another aspect, there is provided a RAN node of a radio communication network. The RAN node is suitable for communication with a gateway of a capillary network, wherein one or several communication devices are communicatively connectable to the RAN node via the gateway. For example, the RAN node may be an eNB. The RAN node comprises an acquiring module configured to acquire information related to a DRX configuration that is preferred by the gateway for the capillary network. Furthermore, the RAN node comprises a processor and a memory. The memory comprises instructions executable by the processor whereby the RAN node is operative to select, based on the acquired information, a DRX configuration to be applied by the RAN node to substantially match the preferred DRX configuration for the capillary network. Also, a configuration message including the selected DRX configuration for configuring the gateway accordingly may be transmitted to the gateway by means of a transmitter. The memory further comprises instructions executable by the processor whereby the RAN node is operative to apply the selected DRX configuration.

In one embodiment, the acquiring module is a receiver configured to receive a message including the information related to the DRX configuration that is preferred by the gateway for the capillary network. The receiver may be configured to receive said message from a CN node, such as a MME. Additionally, or alternatively, the acquiring module may be a receiver configured to receive a message including the information related to the DRX configuration that is preferred by the gateway (for the capillary network) from the gateway, i.e. directly from the gateway itself.

The gateway mentioned hereinabove may be referred to as a Capillary Network Gateway (CGW).

In some embodiments, the memory comprises instructions executable by the processor whereby the RAN node is operative to compare a DRX configuration currently utilized by the RAN node with the DRX configuration that is preferred by the gateway for the capillary network in order to identify whether there is any mismatch between active time periods of the respective DRX configurations, and in response to identifying a mismatch between the active time periods of the respective DRX configurations to compensate for the identified mismatch. Moreover, the memory may comprise instructions executable by the processor whereby the RAN node is operative to compare a DRX configuration currently utilized by the RAN node with the DRX configuration that is preferred by the gateway for the capillary network in order to identify whether there is any mismatch in the overlap between active time periods of the respective DRX configurations; in response to identifying a mismatch between the overlap of the active time periods of the respective DRX configurations check whether said overlap mismatch is equal to or above an overlap mismatch threshold value; and to compensate for the identified mismatch when said overlap mismatch is equal to or above the overlap mismatch threshold value.

The above-mentioned information related to the DRX configuration that is preferred by the gateway may comprise one or more of the following: information about the time length of the DRX cycle, information about the division into active and inactive periods of the DRX cycle.

According to yet another aspect, there is provided a gateway of a capillary network (sometimes also referred to as a Capillary Network Gateway (CGW)). The gateway is suitable for communication with a RAN node of a radio communication network (e.g. an eNB). Also, one or several communication devices are communicatively connectable to the RAN node of the radio communication network via the gateway. The gateway comprises a receiver, a processor and a memory. The receiver is configured to receive (from the RAN node) a configuration message including a DRX configuration for configuring the gateway accordingly. This DRX configuration substantially matches a DRX configuration preferred by the gateway for the capillary network. The memory comprises instructions executable by the processor whereby the gateway is operative to apply this DRX configuration.

The gateway may also comprise a transmitter configured to transmit, to a network node of the radio communication network, a message including information related to a DRX configuration that is preferred by the gateway for the capillary network. In some embodiments, the network node is a SCS. In other embodiments, the network node is the RAN node.

The various embodiments described herein may allow for a synchronization of the DRX configurations utilized by the CGW and the RAN node. That is, the various embodiments described herein allow for a synchronization of the DRX configuration utilized by the CGW on its interface towards the capillary network and the DRX configuration utilized by the RAN node and the CGW on the radio interface between the CGW and the RAN node. Or said differently, the various embodiments may allow for a synchronization of the DRX configurations of the capillary network and a 3GPP network (e.g. LTE). This way, the two DRX configurations may be utilized in unison. This in turn enables a more efficient, and thus improved, usage of the DRX mechanism in capillary network scenarios. For example, in some embodiments it is made possible to ensure that each transmitted data packet will experience only a single DRX incurred delay, because when a DRX cycle of a first radio link has an active period and the data packet is transferred, then the DRX cycle of a second radio link also has an active period so that the packet can be forwarded across the second radio link immediately, or substantially immediately, without any further or unnecessary delay incurred by another DRX cycle.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

In one of its aspects, this disclosure suggests acquiring information related to a DRX configuration that is preferred by the gateway of a capillary network for the capillary network and selecting a DRX configuration, based on the acquired information, to be applied by a Radio Access Network (RAN) node to substantially match said preferred DRX configuration. The selected DRX configuration can be signaled to the gateway such that the gateway can adapt, or configure, its DRX configuration accordingly. Also, the selected DRX configuration is applied, or otherwise utilized, by the RAN node. This way, the RAN node applies the same (or at least a sufficiently similar) DRX configuration that is preferred by the gateway for the capillary network. Again, it should be appreciated that throughout this disclosure the phrase "preferred by the gateway for the capillary network" should be understood to mean "preferred by the gateway on its capillary network interface". This may allow for a synchronization of the DRX configurations utilized by the gateway and the RAN node, respectively. In other words, this may allow for a synchronization of the DRX configurations of the capillary network and a 3GPP network (e.g. LTE). This way, the two DRX configurations may be utilized in unison. This in turn enables a more efficient, and thus improved, usage of the DRX mechanism in capillary network scenarios. In the following, various embodiments will be described in more detail.

Figure 1:
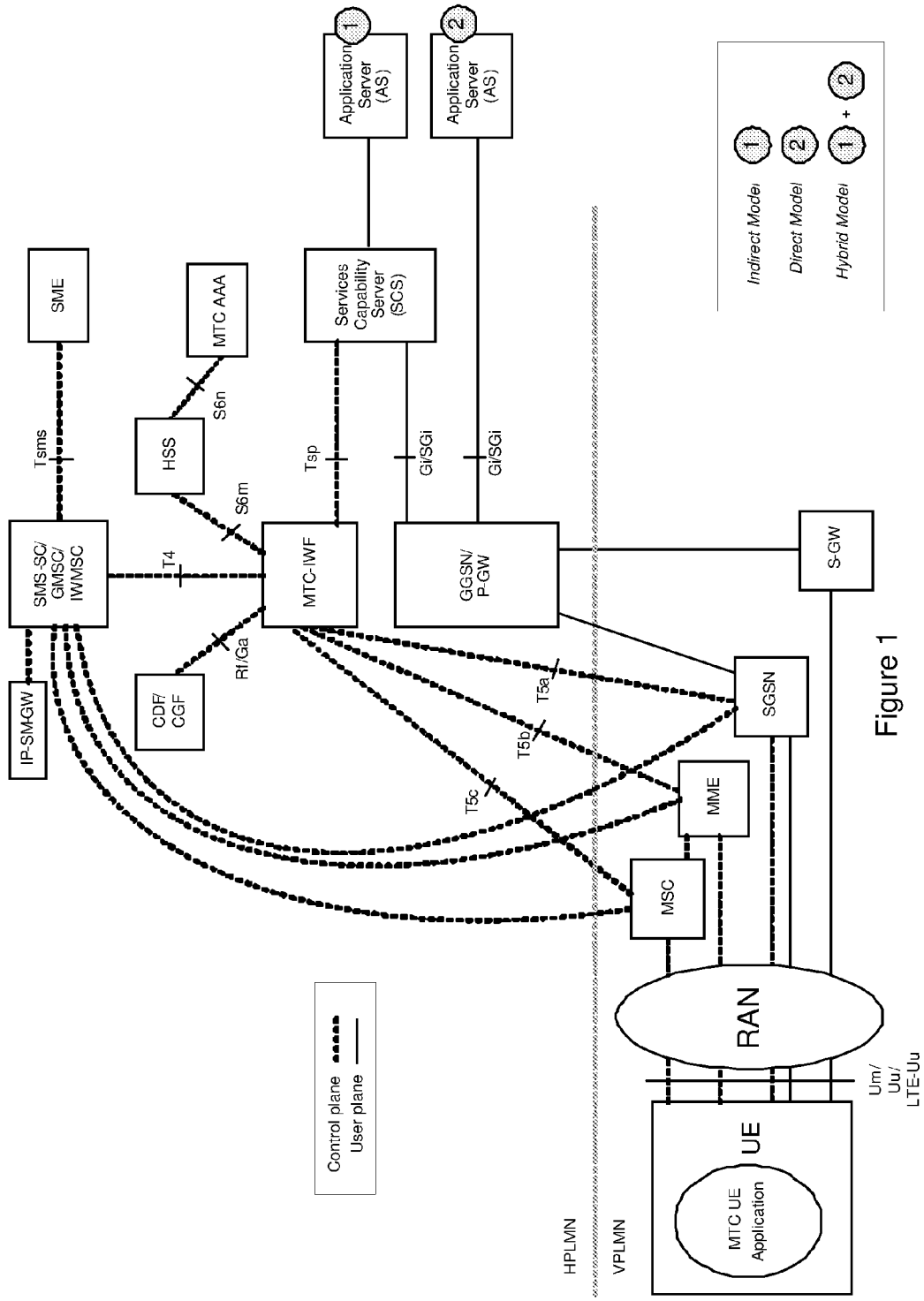
FIG. 1 shows a 3GPP reference network architecture for MTC communication.
Figure 2:
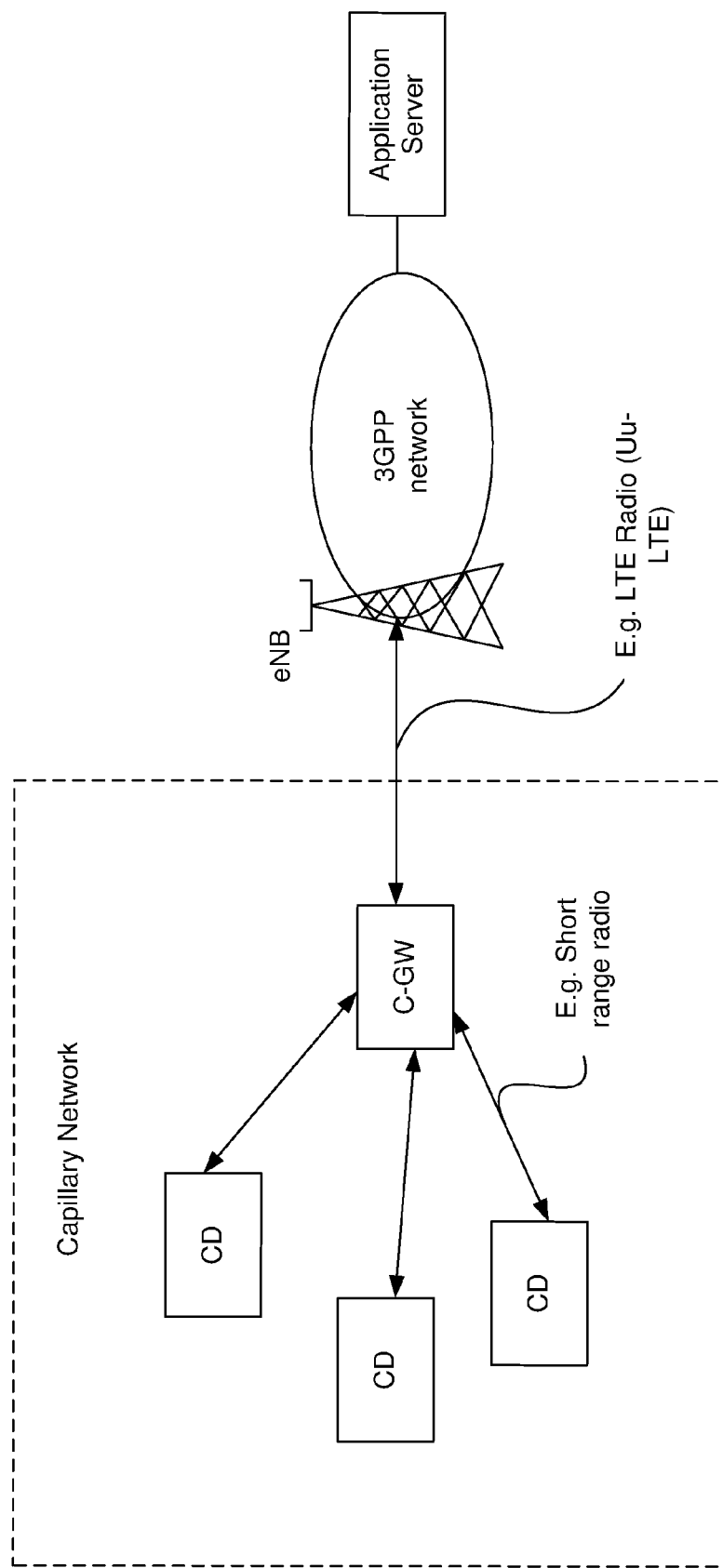
FIG. 2 shows a capillary network environment.
Figure 3A:
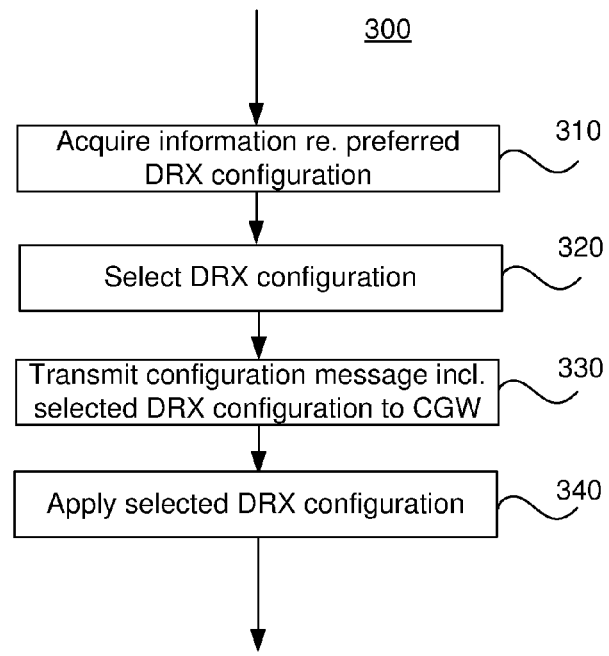
FIG. 3A-C are flowcharts illustrating embodiments of method steps executable by a RAN node.

With reference to FIG. 3A, a method performed by RAN node of a radio communication network (e.g. LTE) will be described. One or several communication devices (CDs) are communicatively connectable to the RAN node via a gateway of a capillary network (see FIG. 2). Information related to a DRX configuration that is preferred by the gateway for the capillary network is acquired 310. The information related to the DRX configuration that is preferred by the gateway may, e.g., comprise one or more of the following: information about the time length of the DRX cycle, information about the division (or, split) into active and inactive periods of the DRX cycle and possibly other parameters of interest. As will be appreciated later with respect to FIGS. 5-10, there are different ways of acquiring this information. Subsequently, a DRX configuration is selected 320. The selection 320 of DRX configuration is based on the earlier-acquired information such that the DRX configuration selected 320 to be applied by the RAN node is selected to match, or substantially match, the DRX configuration that is preferred by the gateway for the capillary network.

Also, a configuration message including the selected DRX configuration is transmitted 330 to the gateway. The configuration message may be a data message having one or several data fields, wherein at least one of the data field(s) includes or indicates the selected DRX configuration. Thereby, the gateway may receive said configuration message for configuring the DRX configuration utilized by the gateway in accordance with the selected DRX configuration. Moreover, the selected DRX configuration is applied 340 or otherwise utilized by the RAN node itself. Since the selected DRX configuration is based on the acquired information, the DRX configuration applied by the RAN node will correspond, or substantially correspond, to the DRX configuration that is preferred, or considered ideal, by the gateway.

Figure 3B:
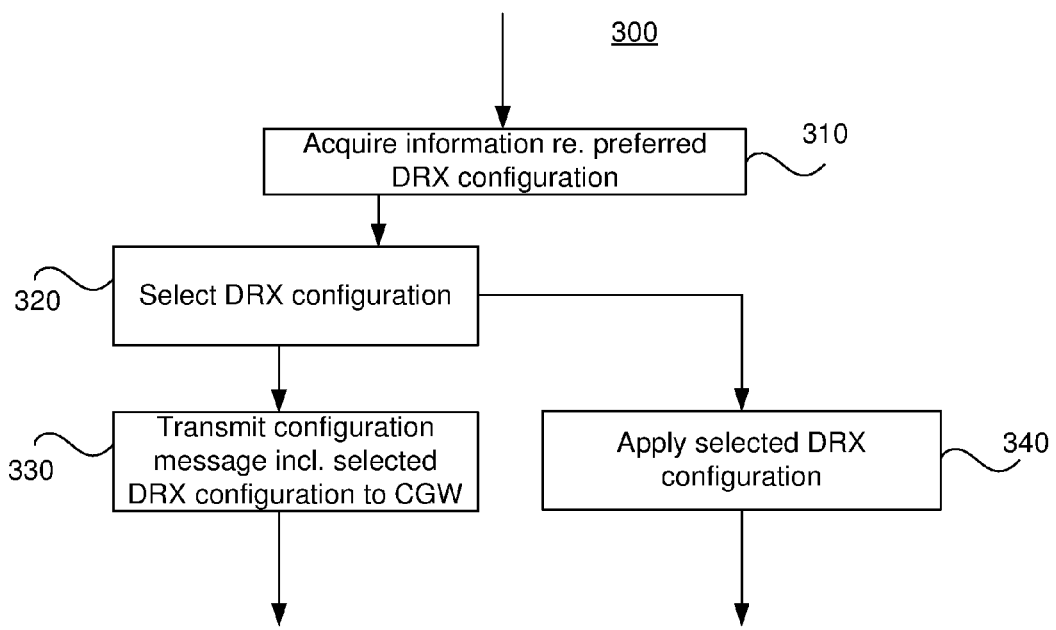

A person skilled in the art will recognize numerous variations to the embodiment described with respect to FIG. 3A that would still fall within the scope of the appended claims. For example, in the example method shown in FIG. 3A the method steps, or actions, are performed in a certain order. However, it is recognized that this sequence of method steps, or actions, may take place in another order without departing from the scope of the appended claims. For example, some method steps or actions may be performed in parallel even though they have been described as being performed in sequence. As a mere example, FIG. 3B illustrates such an alternative example embodiment.

Figure 3C:
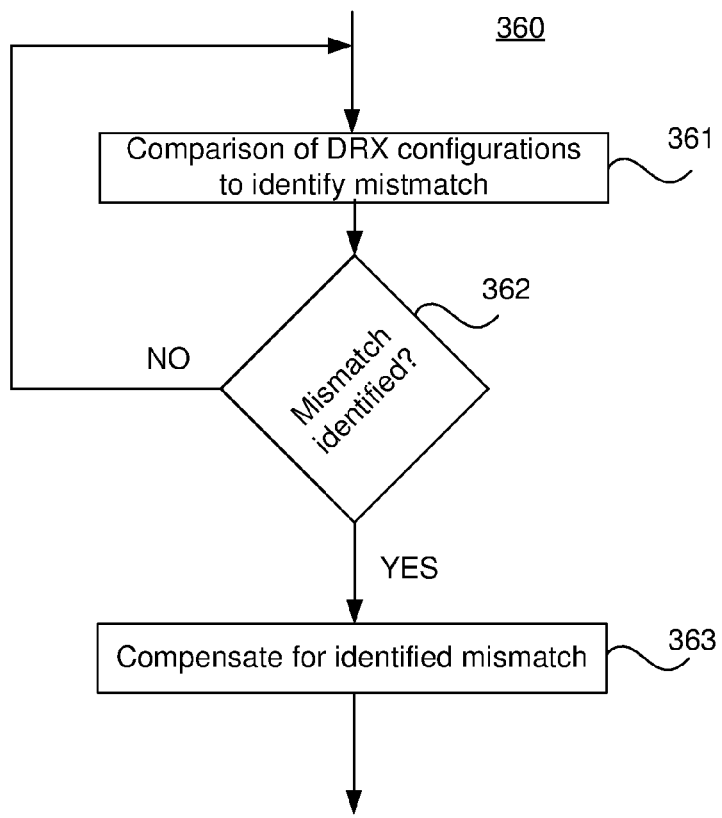

FIG. 3C illustrates methods steps, or actions, that may optionally be performed by the RAN node in some embodiments. A DRX configuration currently utilized by the RAN node is compared 361 with the DRX configuration that is preferred by the gateway for the capillary network in order to identify whether there is any mismatch between active time periods of the respective DRX configurations. In response to identifying a mismatch between the active time periods of the respective DRX configurations the compensation method, or adjustment method, 360 continues by compensating 363 for any such identified mismatch. In some example embodiments, the DRX configuration currently utilized, or currently in use, by the RAN node is compared 361 with the DRX configuration that is preferred by the gateway for the capillary network to identify whether there is any mismatch in the overlap between active time periods of the respective DRX configurations. If, or when, a mismatch between the overlap of the active time periods of the respective DRX configurations is identified it is further checked whether said overlap mismatch is equal to or above an overlap mismatch threshold value, whose value may be pre-defined. Subsequently, the method 360 may continue by compensating 363 for the identified mismatch when the overlap mismatch is determined to be equal to or above the overlap mismatch threshold value. The exact value of the overlap mismatch threshold value should preferably be tested and evaluated for each specific case depending on various requirements or needs. For example, the overlap mismatch threshold value may be expressed in absolute terms such as 10, 25 or 40 milliseconds overlap mismatch. The overlap mismatch threshold value does not necessarily have to be expressed in absolute terms as a value. As an alternative, an overlap mismatch threshold could be expressed in relative terms such as a certain percentage. That is, when an overlap mismatch is equal to or above a certain percentage (e.g. 50% or 70%), the overlap mismatch is considered too big and should be compensated for.

Instead of an overlap mismatch threshold value, alternative embodiments may provide an overlap threshold value below which overlap threshold value the overlap is considered too poor (and hence the overlap mismatch too big). In such embodiments, the DRX configuration currently utilized by the RAN node is also compared 361 with the DRX configuration that is preferred by the gateway for the capillary network in order to identify whether there is any mismatch in the overlap between active time periods of the respective DRX configurations. If, or when, a mismatch between the overlap of the active time periods of the respective DRX configurations is identified it is further checked whether the overlap is below the overlap threshold value, whose value may be pre-defined. Subsequently, the method 360 may continue by compensating 363 for the identified mismatch when the overlap is determined to be below the overlap threshold value. The exact value of the overlap threshold value should advantageously be tested and evaluated for each specific case depending various requirements or needs. For example, the overlap threshold value may be expressed in absolute terms such as 10, 25 or 40 milliseconds overlap. Similar to above, the overlap threshold value does not necessarily have to be expressed in absolute terms as a value but could instead be expressed in relative terms.

In some embodiments, the compensation method 360 may be implemented based on dead reckoning. For example, dead reckoning may generally refer to a method, or technique, of keeping track of a measurement value without direct access to the measurement value, but through an indirect measurement. In the case of DRX configuration mismatch tracking, dead reckoning may refer to a process performed by the RAN node by which the RAN node can estimate how the two DRX configurations slide in relation to each other, using only its own clock, its direct access to the DRX configuration on the cellular network radio interface and its knowledge of the nominal values of the DRX configuration on the capillary network interface of the gateway (i.e. without being able to directly measure the mismatch). Dead reckoning is generally known to persons skilled in the art and will therefore not be further detailed herein. Some further details regarding the compensation method 360 will however be presented in connection with the embodiments described with respect to FIGS. 5-10.

Figure 4:
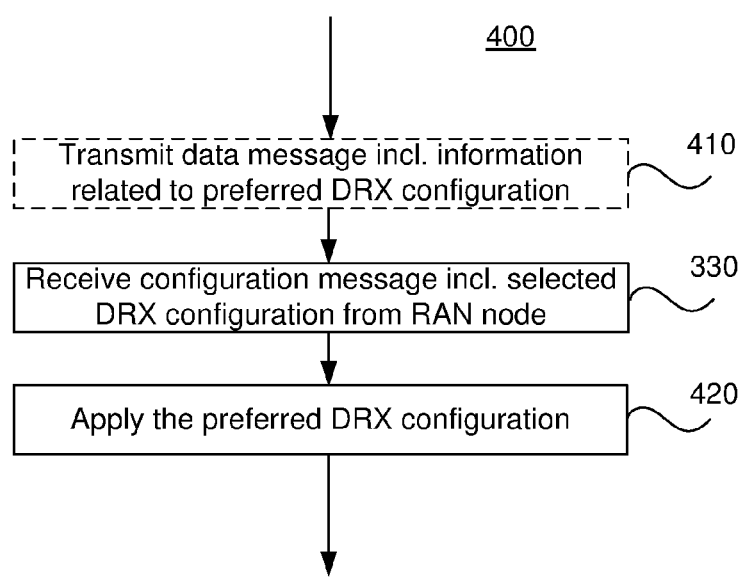
FIG. 4 is a flowchart illustrating an embodiment of method steps executable by a gateway of a capillary network.

Turning now to FIG. 4, a method performed by a gateway of a capillary network will be described. The gateway may be referred to as a Capillary Network Gateway (CGW). Again, one or several communication devices (CDs) are communicatively connectable to a RAN node (e.g., an eNB) of a radio communication network via the gateway. The method comprises receiving 330, from the RAN node, a configuration message. This configuration message includes a DRX configuration for configuring the gateway accordingly. The configuration message may for example be data message having one or several data fields, wherein at least one of the data field(s) includes or indicates the DRX configuration. Thereby, the gateway may receive 330 said configuration message for configuring its DRX configuration. As mentioned hereinabove with respect to FIG. 3 the included, or otherwise indicated, DRX configuration has been configured by the RAN node to match, or substantially match, the DRX configuration that is preferred by the gateway for the capillary network. Subsequently to receiving 330 the configuration message having the DRX configuration, this DRX configuration is applied 420 by the gateway.

Prior to receiving 330 the configuration message, the method may optionally comprise transmitting 410 a message including information related to a DRX configuration that is preferred by the gateway for the capillary network. This message may be transmitted, i.e. sent, from the gateway to a CN node or a RAN node. In some embodiments, the message is sent to a SCS (see e.g. FIG. 5). In other embodiments, the message is transmitted to the RAN node (see e.g. FIG. 6). The message itself may be a data message having one or several data fields, wherein at least one of the data field(s) includes or indicates the preferred DRX configuration. The preferred DRX configuration can thus be seen as the DRX configuration that is considered as the most ideal or the best DRX configuration for the gateway. Thus, the preferred DRX configuration can also be considered to be the most suitable DRX configuration.

What a preferred DRX configuration is may differ. In some embodiments, the preferred DRX configuration may be pre-defined, or otherwise known to the CGW. In other embodiments, the preferred DRX configuration may be derived from application requirements. For example, the preferred DRX configuration could originate from the application (i.e. the application running on the CD with a counterpart on an Application Server (AS) (see FIG. 2)) or from configuration data matching the application requirements. Optionally, any physical limitations of the CD, i.e. typically in terms of the amount of energy available to the CD, may also be taken into account, such that the DRX configuration becomes a tradeoff between the delay requirements of the application and the desired energy efficiency of the CD. This information regarding the preferred DRX configuration may originate from the CD (and/or possibly the AS) or be stored as configuration data in an appropriate entity of the network.

In the following, various detailed embodiments will be described with respect to the signaling diagrams shown in FIGS. 5 through 11. The embodiments will be described in terms of EPS/LTE and with the details of such a system, but it should be noted that the general concept of the embodiments is applicable also to UMTS/WCDMA/HSPA and potentially other cellular radio systems.

Figure 5:
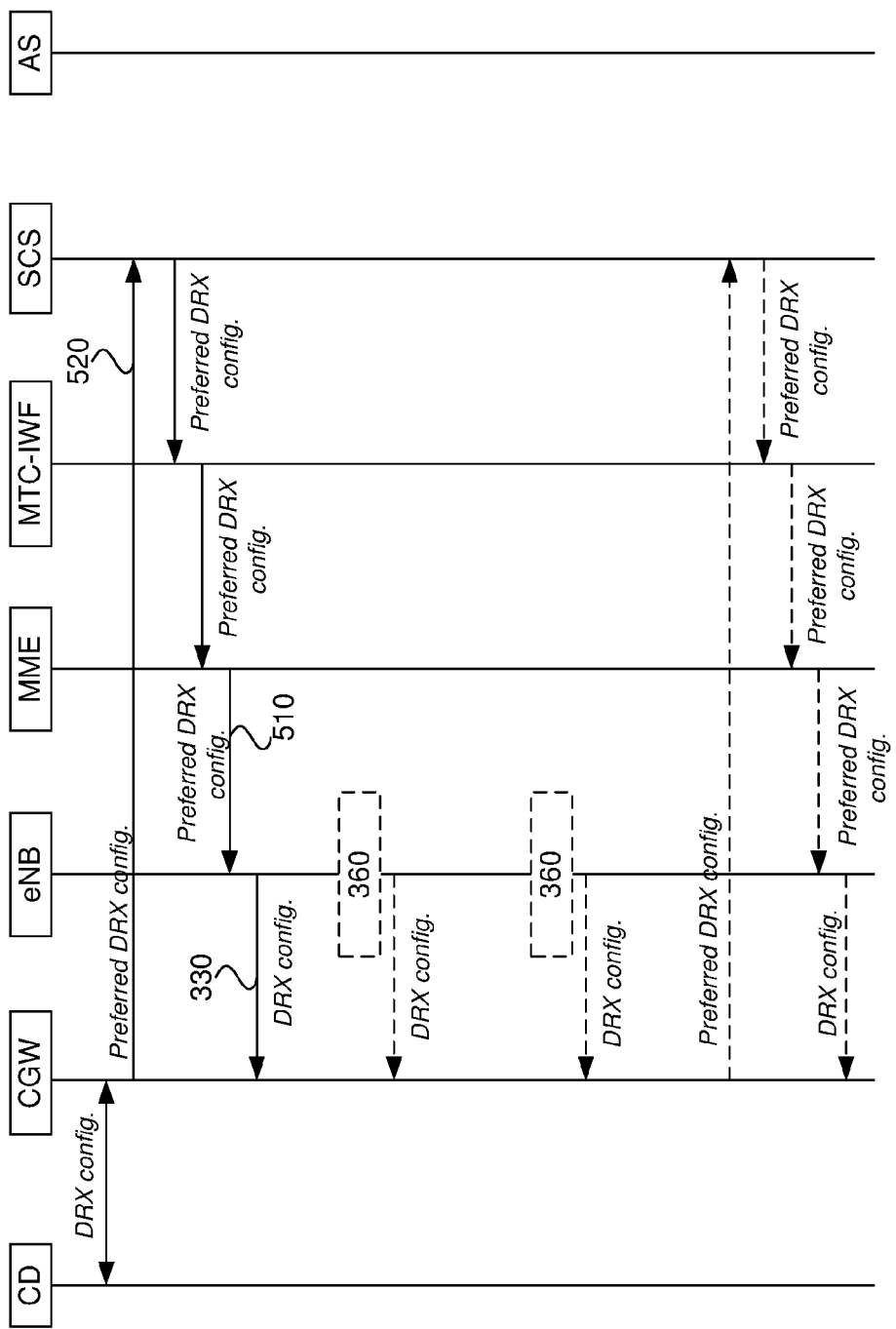
FIGS. 5-10 illustrate signaling diagrams of message sequences in different embodiments.

FIG. 5 illustrates a first embodiment, where the CGW can act as an UE towards the eNB. As can be seen, the CGW transmits 520 a message including the information related to the preferred DRX configuration to the SCS. The information related to the DRX configuration that is preferred by the CGW may, e.g., comprise one or more of the following: information about the time length of the DRX cycle, information about the division (or, split) into active and inactive periods of the DRX cycle (e.g. the duty cycle) and/or possibly other parameters of interest such as preferred start of the DRX cycle. For example, the communication between the CGW and the SCS may be application layer signaling conveyed through the user plane. The SCS receives 520 the message including the information related to the preferred DRX configuration from the CGW. The SCS then forwards, i.e. transmits, the information related to the preferred DRX configuration (in another message) to the MTC-IWF (MTC Interworking Function). In turn, the MTC-IWF forwards this information related to the preferred DRX configuration (in another message) to the MME. The MME also forwards, i.e. transmits 510, this information related to the preferred DRX configuration (in another message) to the eNB. The eNB thus receives 510, from the MME, the message including the information related to the DRX configuration that is preferred by the CGW.

Based on the information received 510 from the MME, the eNB may select a DRX configuration for the CGW. Once a DRX configuration has been selected, or determined, by the eNB, the eNB transmits a configuration message including the selected DRX configuration to the CGW for configuring the CGW accordingly. For example, the configuration message may be transmitted from the eNB to the CGW by means of a RRCConnectionReconfiguration message (RRC is an abbreviation for Radio Resource Control).

Moreover, the eNB can apply a DRX configuration that matches the DRX configuration that is preferred by the CGW for the capillary network. The DRX configuration selected by the eNB should thus match, or substantially match, the preferred DRX configuration as signaled by the CGW to the SCS. However, in some scenarios it might be difficult to achieve a perfect match e.g. due to poor granularity of DRX configuration possibilities on the LTE (or other cellular system) radio interface and to some extent the difference between the schedulable time unit of the LTE radio interface (i.e. a 1 ms subframe) and the corresponding time unit of the capillary network interface (e.g. slot or frame). This may possibly also be so due to (although to a lesser extent) relative clock drifts between the clock in the eNB and the clock governing the timing of the capillary network interface. Thus, as used herein, the term "substantially match" is used to mean a match that is sufficiently good for achieving the desired synchronization of DRX configurations between the capillary network and the cellular radio communication network (e.g. LTE). In other words, the match does not need to be a 100% match. A certain deviation from a 100% match is of course allowed. Generally, there should be sufficient overlap between the active periods of respective DRX cycles and the cycle lengths should preferably not differ so much that it becomes necessary or important to often reconfigure the DRX configuration to compensate for e.g. relative sliding of the two DRX cycles. What often means depends, among other things, on the relation between the resources (including CGW energy) spent for reconfiguring the DRX cycles and the resources (in particular CGW energy) saved through the DRX feature. In other words, exactly what is meant by "substantially match" may differ from one embodiment to another and between various use case scenarios and applications.

With continued reference to FIG. 5, if a mismatch between the DRX configurations becomes too large, then an alternative is to attempt to configure the LTE DRX cycle length such that the preferred cycle length becomes a multiple of the LTE DRX cycle length. An alternative means of dealing with the mismatch is to use the length of the active period on the LTE radio interface, as mainly controlled by the on-duration timer to compensate for non-ideal DRX cycle lengths. Due to the above described mismatch, the DRX cycles, and thus the active periods, of the LTE DRX and the capillary network DRX may slide in relation to each other as time elapses, thus gradually reducing the overlap between the active periods, and at some point the overlap between the active periods might become non-usable (e.g. not sufficient time to receive a full transmission). The longer the active period is, the longer it might take until there is no longer sufficient overlap between the active periods on the LTE and capillary network interfaces. The extent to which the active period should be extended in order to postpone adjustments of the LTE DRX configuration is generally a trade-off between long active periods (meaning less energy saving) and frequent reconfigurations (i.e. adjustments to resynchronize the DRX cycles which consumes both LTE radio resources and energy).

Knowing the mismatch between the configured DRX cycle and the preferred, or desired, DRX cycle, the eNB can calculate or otherwise determine when the active periods no longer have a sufficient overlap and consequently reconfigure the LTE DRX cycle at appropriate occasions to compensate (see reference 360 in FIG. 5) for sliding in time relative to the preferred cycle length (i.e. when there is no longer sufficient overlap between the active periods on the LTE and capillary network interfaces). In some embodiments, the compensation 360 may for example be performed using a RRCConnectionReconfiguration message including DRX configuration information with the start offset parameter set to a value that matches the start of a preferred cycle.

In some embodiments, the compensation performed by the eNB may be based on dead reckoning. As clocks are generally not perfect and the preferred DRX cycle length expressed by the CGW may be rounded, there may be a long-term sliding between the preferred DRX cycle and the one being used, despite the compensation from the eNB (when the compensation is based on dead reckoning in the eNB). Hence, when needed or when appropriate (either continuously or at certain intervals), the CGW sends messages including compensation indications to the SCS, which forwards them to the eNB (via the MTC-IWF and the MME). If the CGW synchronizes its internal clock with the LTE radio interface and the same clock is used for the timing on the capillary network interface, then there will generally be no, or very small, relative clock drifts and these infrequent long-term compensations will thus not necessarily be needed.

Figure 6:
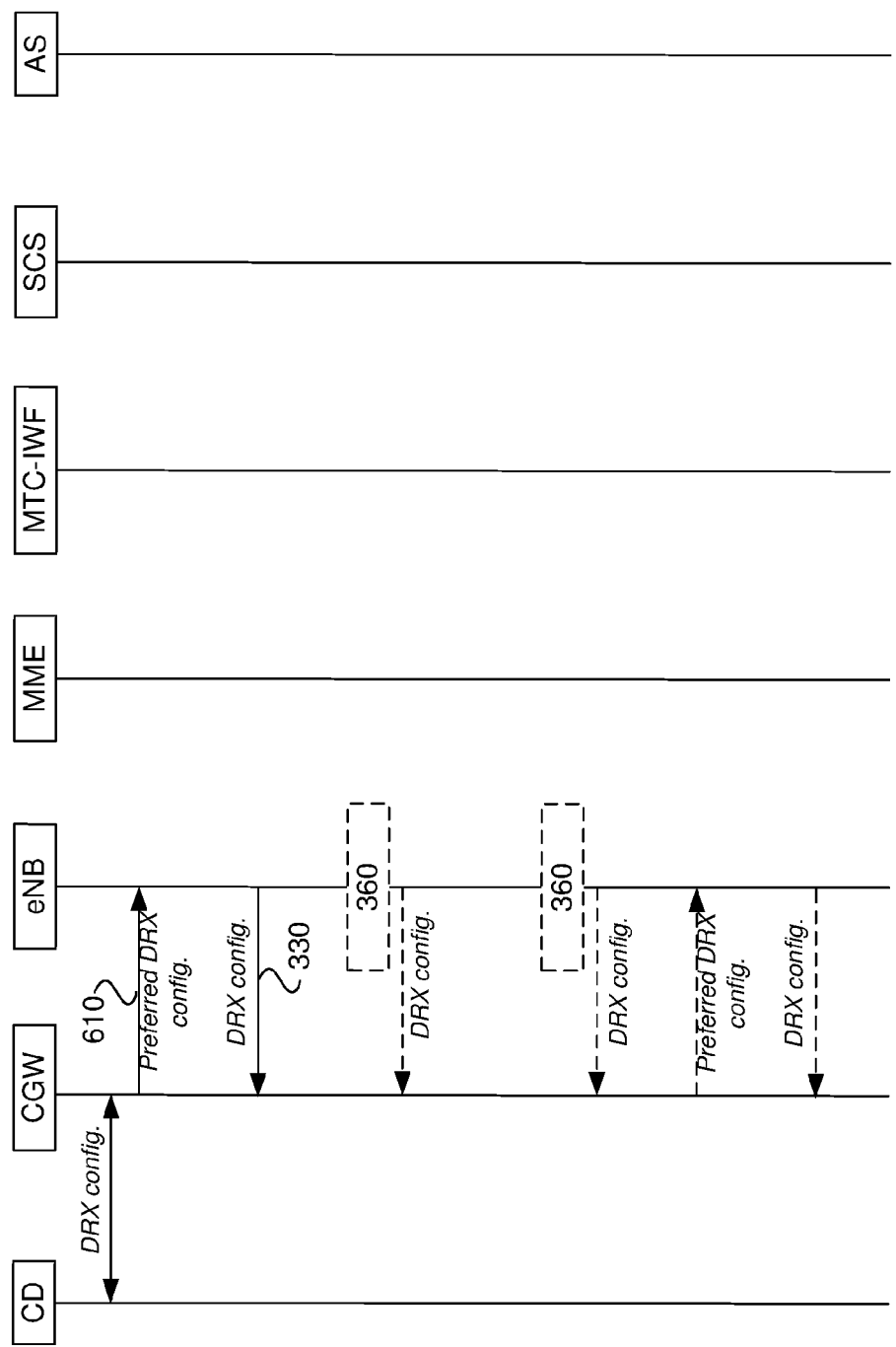

FIG. 6 illustrates another embodiment, where the CGW communicates directly with the eNB. As can be seen in FIG. 6, the SCS, the MTC-IWF and the MME are not involved. The CGW transmits 610 a message including the information related to the preferred DRX configuration to the eNB. The information related to the DRX configuration that is preferred by the gateway may, e.g., comprise one or more of the following: information about the time length of the DRX cycle, information about the division (or, split) into active and inactive periods of the DRX cycle (e.g. the duty cycle) and/or possibly other parameters of interest such as preferred start of the DRX cycle. The eNB thus receives 610 the message including the information related to the DRX configuration that is preferred by the gateway directly from the gateway. The same principles and methods as described with respect to FIG. 5 can be applied to the embodiment of FIG. 6 and will therefore not be repeated here. In the embodiment of FIG. 6, it would be advantageous to use RRC signaling between the CGW and the eNB for transmitting the information related to the DRX configuration. If using RRC signaling, the above-mentioned message including the information related to the preferred DRX configuration could be a data message having one or more data fields, where at least one data field (e.g. an information element) includes or otherwise indicates the preferred DRX configuration. Alternatively, it would be conceivable to make use of the MAC protocol because DRX is inherently a MAC feature and there is already a MAC Control Element related to the DRX feature (e.g. the DRX Command Control Element). Other implementations are also conceivable for those skilled in the art. Also this embodiment allows for performing regular compensations 360, if necessary or appropriate.

Figure 7:
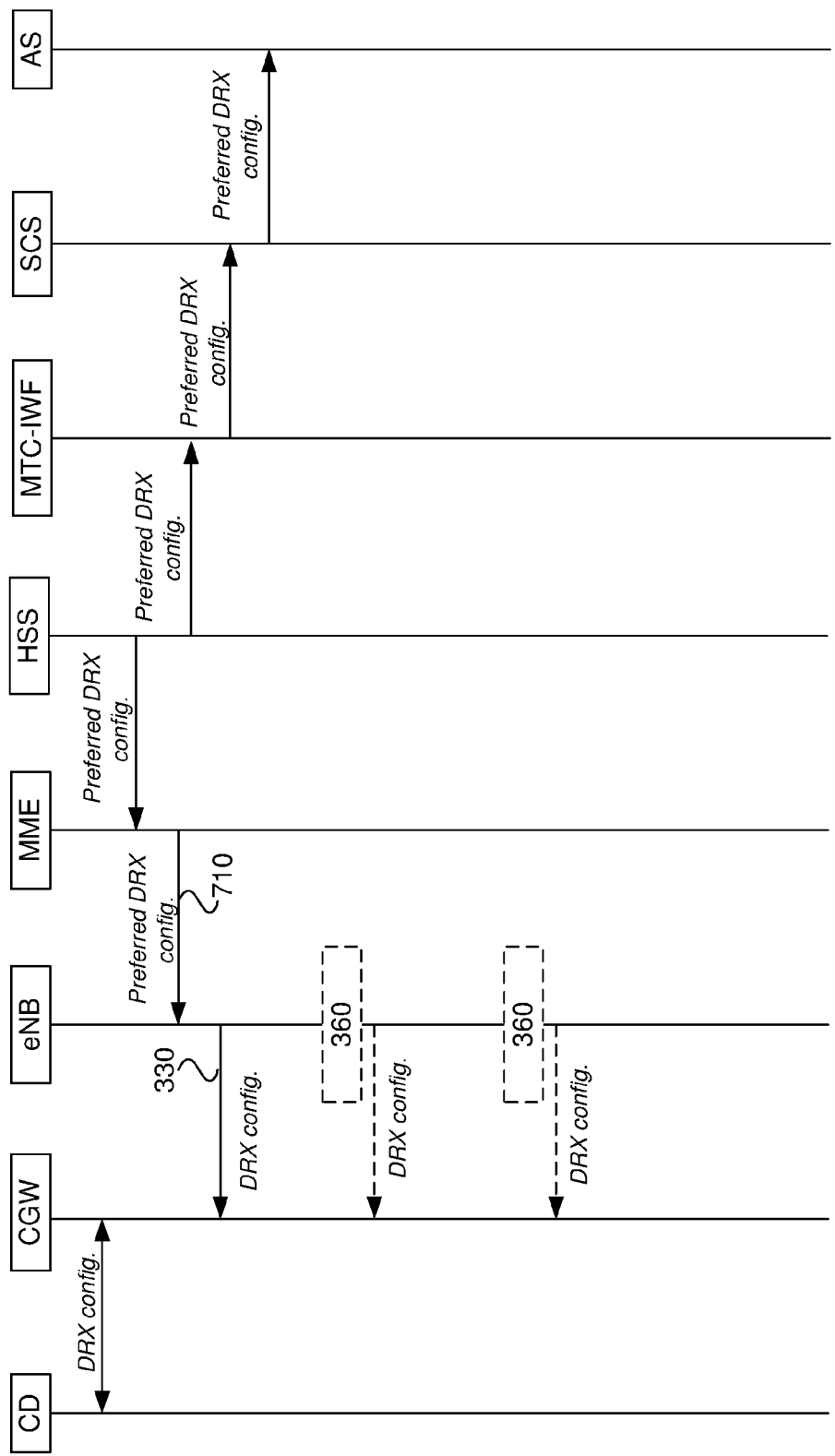

FIG. 7 illustrates yet another embodiment. In this embodiment, the information related to the preferred DRX configuration is stored in the subscriber data of the CGW within the Home Subscriber Server (HSS). The MME downloads, or otherwise receives, the information related to the preferred DRX configuration from the HSS when the CGW registers in the MME. The MME then forwards, i.e. transmits 710, a message including this information to the eNB. For example, the MME may forward a S1AP message, e.g. an INITIAL CONTEXT SETUP REQUEST message, including this information to the eNB. The eNB thus receives 710 a message including the information related to the preferred DRX configuration. Also, the eNB transmits 330 a configuration message including the selected DRX configuration to the gateway for configuring the gateway accordingly. This configuration message may be transmitted in the form of a RRCConnectionReconfiguration message. Also this embodiment allows for performing regular compensations 360, if necessary or appropriate. As an optional variant of this embodiment, the Application Server (AS) could also be informed of the preferred DRX configuration stored in the subscriber data of the CGW in the HSS. For example, the HSS may transfer the formation related to the preferred DRX configuration to the MTC-IWF, which forwards it to the AS via the SCS.

Figure 8:
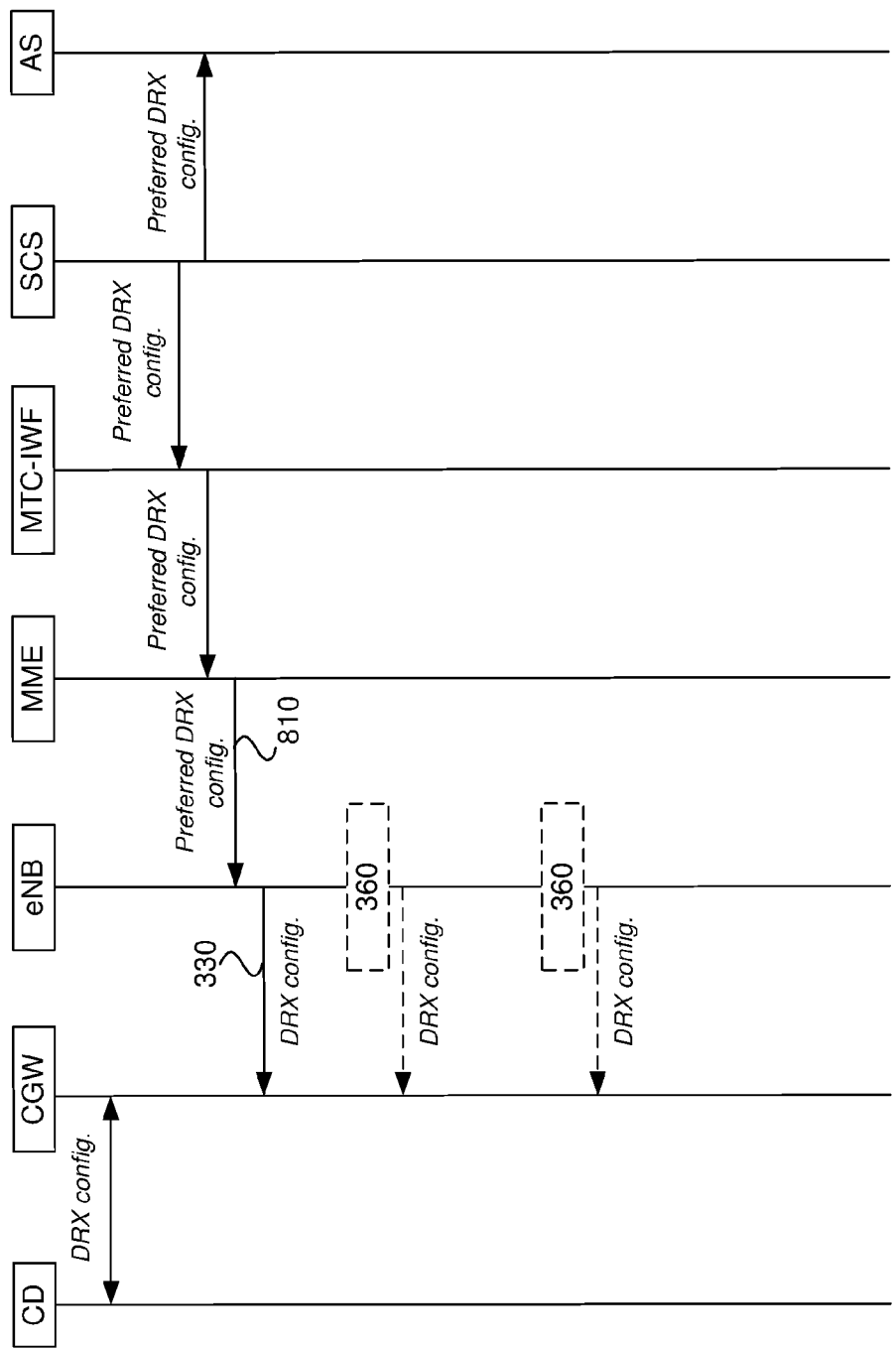
Figure 9:
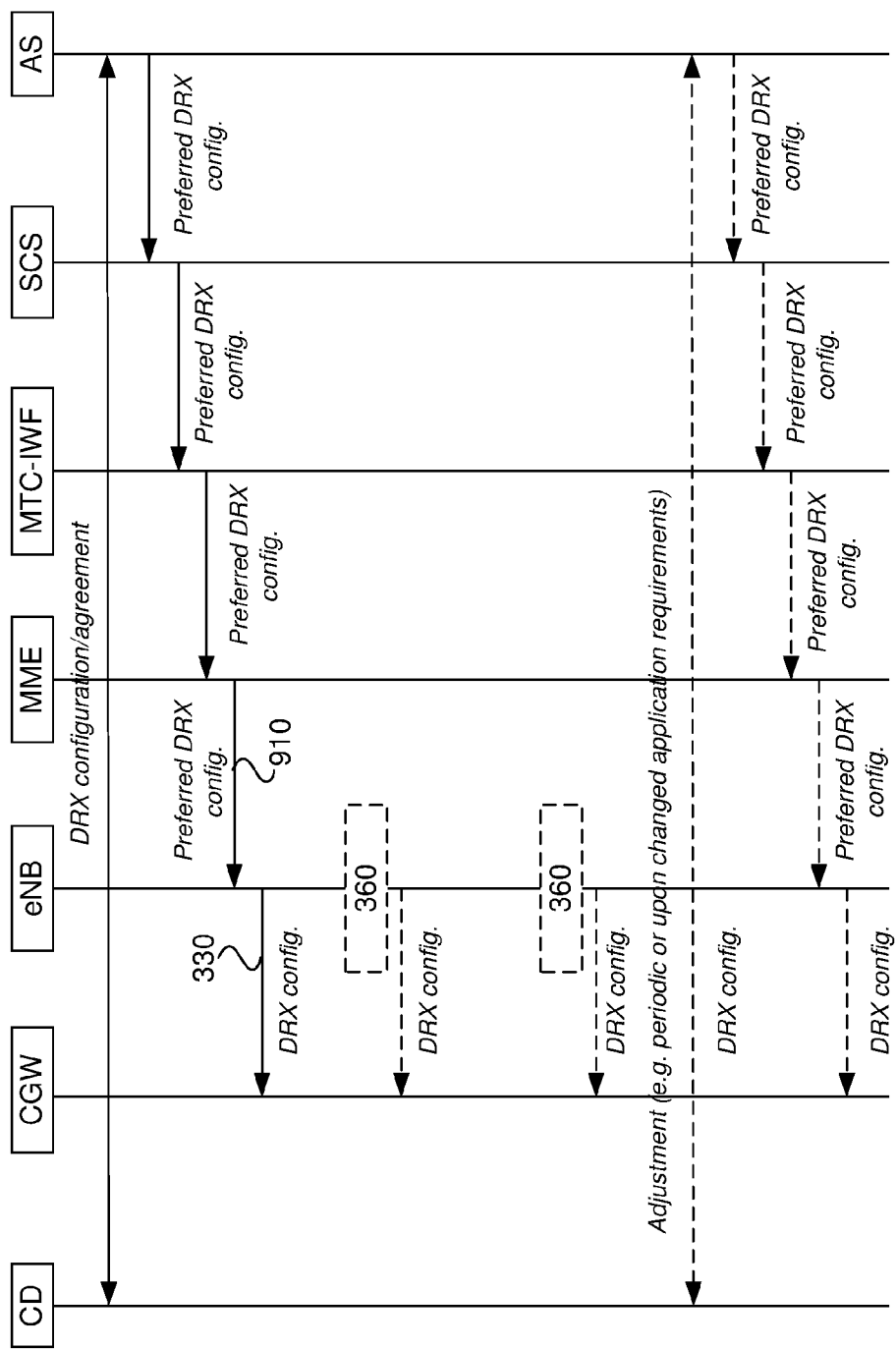

FIG. 8 illustrates still another embodiment. In this embodiment, the information related to the preferred DRX configuration is preconfigured in the SCS. The SCS transmits this information to the MME via the MTC-IWF. The trigger for the SCS to do so may come from the MTC-IWF or the AS. The MTC-IWF may in turn be triggered by information about an MME registration for the CGW from either the HSS or the MME. The MME forwards the preferred DRX configuration to the eNB, e.g., in the S1AP message INITIAL CONTEXT SETUP REQUEST and the eNB configures the CGW accordingly e.g. through a RRC-ConnectionReconfiguration message. As an optional variant of this embodiment, the AS could also be informed of the preferred DRX configuration stored in the SCS. In such a case, the SCS transfers the information related to the preferred DRX configuration in a message to the AS.

It should be appreciated that if multiple CDs, e.g. running different applications, with different requirements on the preferred DRX cycle length are present in a capillary network, the LTE DRX configuration may have to be selected so that this heterogeneity is accounted for. In some embodiments where the CGW provides the cellular network with the preferred DRX configuration based on DRX configuration information from the CDs (e.g. embodiments shown in FIGS. 5 and 6) the CGW may be responsible for adapting the preferred DRX configuration communicated to the cellular radio communication network so that it takes the heterogeneous situation into consideration. In other embodiments where the preferred DRX configuration is stored in a node in the cellular radio communication network (e.g. embodiments shown in FIGS. 7 and 8) it is assumed that the heterogeneity is already accounted for in the stored preferred DRX cycle.

One option to take the different DRX cycle length preferences into account is to select the smallest of the different preferred DRX cycle lengths, i.e. the smallest of the different DRX cycle lengths preferred by/for the different CDs in the capillary network.

Regarding the DRX cycles used for the CDs in the capillary network, these may be chosen either to match the respective CD's ideal DRX cycle or to match the LTE DRX cycle or a multiple of the LTE DRX cycle. The choice of which approach to use may be left to the CGW or may be negotiated between the CGW and each individual CD.

In yet other embodiments, a DRX configuration on the application level may be useful. An application level DRX configuration would preferably, but not necessarily, be created as an agreement between the CD and the AS, either after a negotiation between the two entities or in the form of instructions from one of the entities to the other, e.g. from the AS to the CD. The agreement, or rather the DRX configuration information constituting this agreement, may also be preconfigured in the CD and the AS. Such an agreement would preferably be independent of the capillary network technology. However, if it does not take circumstances of the capillary network into account, challenges may arise, if, for instance, the particular point in time which has been agreed on as a communication occasion (i.e. an active period) happens to be occupied by something else, e.g. a beacon transmission in the capillary network. Such challenges may be avoided in two ways: i) Take the capillary network technology into account (i.e. no independence of capillary network technology), ii) have a more relaxed configuration of the application level DRX. Taking the capillary network technology into account means that the application level DRX may be configured in terms of the capillary technology, e.g. an agreement to communicate every $1000^{th}$ beacon interval. This facilitates that time slots that are inherently prohibited for communication in the capillary network, e.g. beacon slots may be avoided. Possibly the application level DRX agreement could even be extended with more detailed information about time slots to be excluded from active periods, if needed. Having a more relaxed configuration of the application level DRX is another approach that may be used to overcome the above described challenge. For instance, the application level DRX agreement may state that every 10 minutes there will be a 2 ms communication event (or a communication event involving a certain amount of data) some time within a time window of 20 ms. Then the packets to be sent will be placed in the transmission buffer/queue at the stipulated time and will be transmitted once the capillary network technology allows for it. The receiving entity would have to be prepared to receive data during the entire time window. Although this is probably acceptable for the AS (or other entity communicating with the CD), a more energy efficient alternative may be preferred, especially for an energy deprived CD or an energy deprived CGW (in case the application level DRX configuration is used also between the CD and a CGW. A more efficient alternative could be that an entity that is part of a DRX agreement listens for data, i.e. is prepared to receive data, only for the last part of the time window, e.g. the last 2 ms of the 20 ms time window in the example above, relying on buffering in intermediate nodes to handle the lack of synchronization between the time of transmission at the transmitting entity and the time of reception in the receiving entity. If the end of the time window happens to collide with e.g. a beacon transmission in the capillary network of an entity, e.g. a CD, using this reception strategy (i.e. with a small reception window at the end of the agreed time window), the entity/CD may simply delay the small reception window until after the beacon transmission or divide it into two parts, one part before and one part after the beacon transmission.

Any conceivable method of configuring a longer active period, e.g. a 20 ms active period (corresponding to the time window example above) might not be satisfactory enough as it does not allow an equally energy efficient duty cycle. So some sort of indication of that the communication event has ended would generally be desired, such as the above mentioned time or data volume limits (which makes the fact that a time or data volume limit has been reached an indication that the communication event has ended). It would be more flexible to have a dynamic explicit or implicit stop signal. The AS could include an "end of communication event", "end of transaction" or "end of data" indication in a last DL application level message to be sent within an active period. It would also be possible to use this kind of indication on the link between the CGW and the CD. Also in that case, an application level indication similar to the one described above could be used. However, this would require that the CD and the CGW have a common application level protocol. In the long term it is conceivable that a generic application level protocol could emerge (as an official or de facto standard), but until then other mechanisms may have to be used if an end of communication event indication on the link between the CGW and the CD is desired. A means to achieve this purpose is to utilize already existing features in the capillary network technology as an implicit end of communication event indication. For instance, absence of DL data indication for the CD in a beacon transmission could serve as such an implicit indication, e.g. absence of indication for the CD's association ID in the Traffic Indication Map (TIM) of an IEEE 802.11 beacon or absence of the CD's address in the Address List field (indicating pending DL data) of an IEEE 802.15.4 beacon. Implicit indications also have the advantage of being energy efficient, since they don't involve transmission of any additional data to indicate the end of communication event. When trying to match the LTE DRX configuration and the capillary network DRX configuration (i.e. between the CGW and the CD) with the application level DRX, these DRX cycles may have to be chosen such that the application level DRX cycle becomes a multiple of one or both of these cycles.

As mentioned above, in the long term it would most likely be possible to introduce a standardized protocol (possibly application level protocol) to be used between an arbitrary CD (with an arbitrary application) and a generic CGW which may be under the control of e.g. the 3GPP operator. However, in the shorter term this may not necessarily be realistic. Nevertheless, it would still be conceivable that an Application Server (AS) agrees with its CD(s) on application level DRX (i.e. basically communication periodicity) and that agreement/configuration may be communicated from the AS to the SCS and further to the CGW (and also to the eNB via the MTC-IWF and the MME). Such an example embodiment is illustratively shown in FIG. 9. In some embodiments, the communication between the SCS and the CGW may take place using an application level protocol through the user plane. The SCS may then also inform the eNB via the MTC-IWF and the MME. An alternative to using user plane based communication between the SCS and the CGW is that the SCS informs the CGW via the MTC-IWF, the MME and the eNB (in which case also the eNB is informed in the process).

An alternative could be that the CD informs the SCS (instead of, or possibly after, agreeing with the AS) about the application level DRX and the SCS then informs the CGW as described above. Also in this embodiment it is conceivable that the eNB calculates, or otherwise determines, adjustments of the LTE DRX configuration, when needed (due to mismatch of the configured LTE DRX and the preferred DRX), and configures the CGW accordingly. As described earlier, these DRX configuration adjustments may be based on dead reckoning and hence, may have to be complemented with adjustments in the form of a new preferred DRX configuration conveyed to the eNB (unless the capillary network timing is based on a clock in the CGW that is synchronized with the LTE interface). This adjusted preferred DRX configuration would most naturally originate from the CD, which would inform (or agree with) the AS and the information would then be sent to the eNB as previously described from the AS via the SCS, MTC-IWF and MME. An adjustment originating from the CD may be triggered by a "slip" between the active period of the application level DRX and the active period of the capillary network DRX and/or the LTE DRX, i.e. detection of lack of sufficient overlap between the active DRX periods of different links in the chain of communication links.

Figure 10:
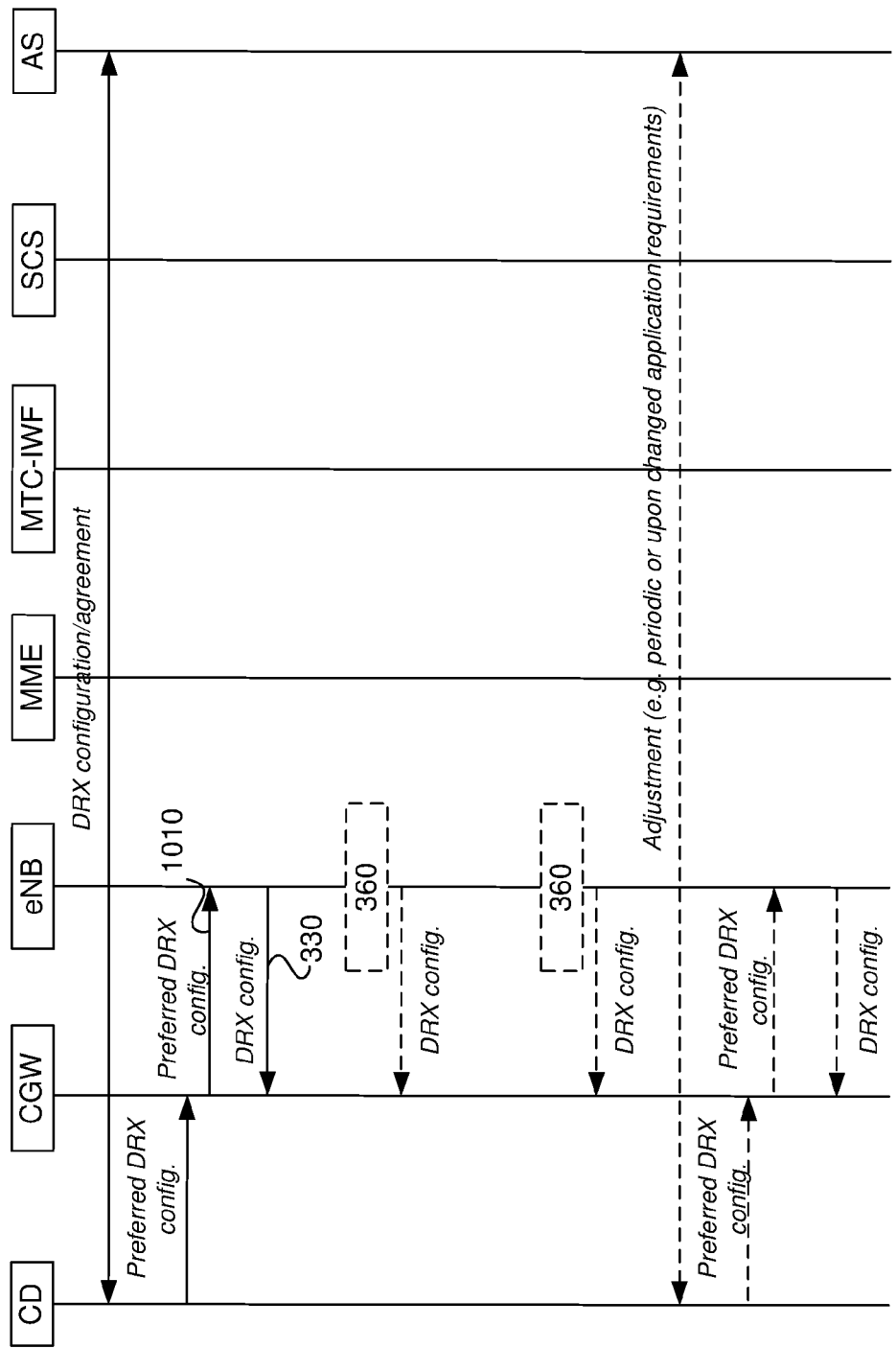

FIG. 10 illustrates still another embodiment. In this embodiment, the application level DRX agreement between the CD and the AS is combined with a method of conveying the preferred DRX configuration to the eNB, which excludes the CN nodes, but utilizes the CGW and the LTE radio interface (similar to the embodiment in FIG. 6).

The CD and the AS agrees on a DRX cycle on the application level (or are preconfigured with the agreed DRX configuration information). The CD then transfers information about the agreement to the CGW and the CGW in turn sends a message comprising information about the preferred DRX configuration across the LTE radio interface to the eNB. This triggers the eNB to calculate, or otherwise determine, the most suitable DRX configuration and the eNB then configures the CGW accordingly.

Also in this embodiment, the eNB may calculate or otherwise determine appropriate adjustments of the LTE DRX configuration, when needed (due to mismatch of the configured LTE DRX and the preferred DRX), and may furthermore configure the CGW accordingly. Again, it should be appreciated that these DRX configuration adjustments may be based on dead reckoning and hence, may have to be complemented with adjustments in the form of a new preferred DRX configuration conveyed to the eNB (unless the capillary network timing is based on a clock in the CGW that is synchronized with the LTE interface). This adjusted preferred DRX configuration would most naturally originate from the CD, possibly through an agreement procedure between the CD and the AS. As previously described, the CD could transfer the information about the adjusted preferred DRX configuration to the CGW which could transfer it to the eNB, which in turn could adjust the LTE DRX configuration accordingly. The actual application level DRX agreement/configuration does not necessarily have to change. It suffices that the CD adjusts the translation of the application level DRX agreement/configuration into a preferred DRX configuration in LTE terms (e.g. LTE subframes and fractions of subframes). In this case the CD does not have to involve the AS in the process and does not even have to inform it. Yet another alternative is that the CGW by itself informs the eNB of required adjustments. An adjustment originating from the CD or the CGW may be triggered by a "slip" between the active period of the application level DRX and the active period of the capillary network DRX and/or the LTE DRX, i.e. detection of lack of sufficient overlap between the active DRX periods of different links in the chain of communication links.

Figure 11:
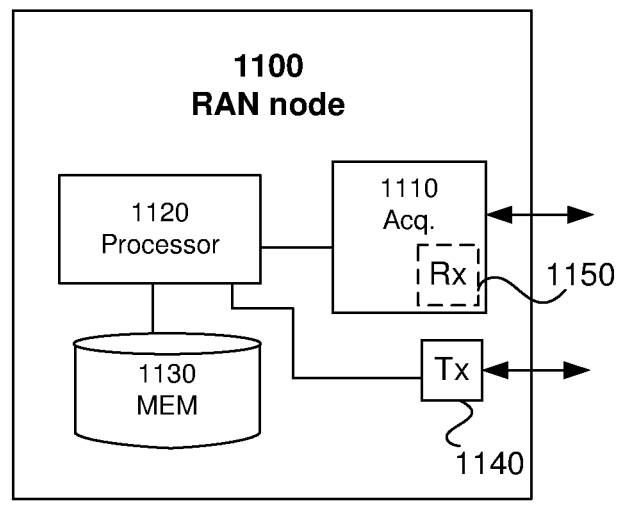
FIG. 11 illustrates an example embodiment of a RAN node such as an eNB.

With reference to FIG. 11, an embodiment of a RAN node 1100 will be described. The RAN node 1100 may be an eNB. The RAN node 1100 is configured to perform, or otherwise execute, the methods described with respect to FIG. 3. In one example embodiment, the RAN node 1100 comprises means 1110 adapted to acquire information related to a DRX configuration that is preferred by the gateway for the capillary network. The information related to the DRX configuration that is preferred by the gateway for the capillary network may e.g. comprise one or more of the following: information about the time length of the DRX cycle, information about the division into active and inactive periods of the DRX cycle.

The RAN node 1100 may also comprise means 1120, 1130 adapted to select a DRX configuration to be applied by the RAN node 1100 based on the acquired information. More particularly, the means 1120, 1130 may be adapted to select, based on the acquired information, the DRX configuration to be applied by the RAN node to match (or substantially match) the preferred DRX configuration for the capillary network. Means 1140 to transmit a configuration message including the selected DRX configuration to the gateway for configuring the gateway accordingly may also be provided. Moreover, the RAN node 1100 may comprise means 1120, 1130 adapted to apply the selected DRX configuration, which thus corresponds to the DRX configuration preferred by the gateway for the capillary network.

For example, the means 1110 adapted to acquire information related to a DRX configuration that is preferred by the gateway for the capillary network may be configured to receive a message including said information from a CN node, such as a MME. Additionally, or alternatively, the means 1110 may be configured to receive a message including said information directly from the gateway.

In some embodiments, the RAN node 1100 comprises means 1120, 1130 adapted to compare a DRX configuration currently utilized by the RAN node with the DRX configuration that is preferred by the gateway for the capillary network in order to identify whether there is any mismatch between active time periods of the respective DRX configurations, and in response to identifying a mismatch between the active time periods of the respective DRX configurations to compensate for the identified mismatch. For example, the means 1120, 1130 may be adapted to compare a DRX configuration currently utilized by the RAN node with the DRX configuration that is preferred by the gateway for the capillary network in order to identify whether there is any mismatch in the overlap between active time periods of the respective DRX configurations, in response to identifying a mismatch between the overlap of the active time periods of the respective DRX configurations check whether said overlap mismatch is equal to or above an overlap mismatch threshold value, and to compensate for the identified mismatch when said overlap mismatch is equal to or above the overlap mismatch threshold value.

In one example implementation, there is provided a RAN node 1100 of a radio communication network for communication with a gateway of a capillary network, wherein one or several communication devices are communicatively connectable to the RAN node via the gateway. The RAN node comprises an acquiring module 1110 configured to acquire information related to a DRX configuration that is preferred by the gateway for the capillary network, a processor 1120, and a memory 1130, wherein the memory 1130 comprises instructions executable by the processor 1120, whereby the RAN node 1100 is operative to select, based on the acquired information, a DRX configuration to be applied by the RAN node to substantially match the preferred DRX configuration for the capillary network; to transmit by means of a transmitter 1140 a configuration message including the selected DRX configuration to the gateway for configuring the gateway accordingly; and to apply the adapted DRX configuration.

The acquiring module may comprise a receiver 1150 (or alternatively be implemented as a receiver 1150) configured to receive a message including the information related to the DRX configuration that is preferred by the gateway for the capillary network. The message may be received from a CN node, such as a MME, or directly from the gateway.

In some embodiments, the memory 1130 further comprises instructions executable by the processor 1120, whereby the RAN node 1100 is operative to compare a DRX configuration currently utilized by the RAN node with the DRX configuration that is preferred by the gateway for the capillary network in order to identify whether there is any mismatch between active time periods of the respective DRX configurations; and in response to identifying a mismatch between the active time periods of the respective DRX configurations to compensate for the identified mismatch. For instance, the memory 1130 may comprise instructions executable by the processor 1120, whereby the RAN node 1100 is operative to compare a DRX configuration currently utilized by the RAN node with the DRX configuration that is preferred by the gateway for the capillary network in order to identify whether there is any mismatch in the overlap between active time periods of the respective DRX configurations; in response to identifying a mismatch between the overlap of the active time periods of the respective DRX configurations check whether said overlap mismatch is equal to or above an overlap mismatch threshold value; and to compensate for the identified mismatch when said overlap mismatch is equal to or above the overlap mismatch threshold value.

Figure 12:
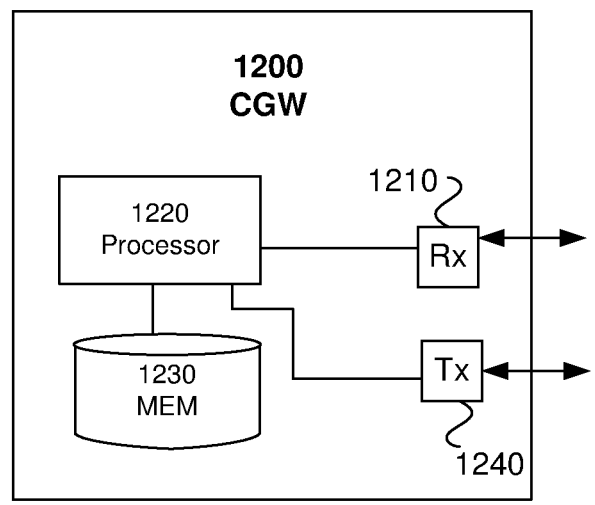
FIG. 12 illustrates an example embodiment of a gateway of a capillary network.

With reference to FIG. 12, an embodiment of a gateway (hereinafter referred to as the CGW) 1200 of a capillary network will be described. The CGW 1200 is configured to perform, or otherwise execute, the method described with respect to FIG. 4. In one example embodiment, the CGW 1200 comprises means 1210 adapted to receive (from a RAN node such as an eNB) a configuration message including a DRX configuration for configuring the CGW accordingly. The DRX configuration substantially matches a DRX configuration preferred by the CGW for the capillary network. The CGW further comprises means 1220, 1230 adapted to apply the DRX configuration. The CGW 1200 may additionally comprise means 1240 adapted to transmit, to a network node, a message including information related to a DRX configuration that is preferred by the CGW for the capillary network. Said network node may e.g. be a SCS. Alternatively, said network node may be the RAN node.

In one example implementation, there is provided a gateway (CGW) 1200 of a capillary network for communication with a RAN node of a radio communication network, wherein one or several communication devices are communicatively connectable to the RAN node of a radio communication network via the gateway. The CGW 1200 comprises a receiver 1210 configured to receive, from the RAN node, a configuration message including a DRX configuration for configuring the gateway accordingly, wherein the DRX configuration substantially matches a DRX configuration preferred by the CGW 1200 for the capillary network, a processor 1220, and a memory 1230, wherein the memory 1230 comprises instructions executable by the processor 1220, whereby the CGW 1200 is operative to apply 420 said DRX configuration. The CGW 1200 may further comprise a transmitter 1240 configured to transmit, to a network node of the radio communication network, a message including information related to a DRX configuration that is preferred by the gateway. Said network node may e.g. be a SCS. Alternatively, the network node may be the RAN node.

Figure 13:
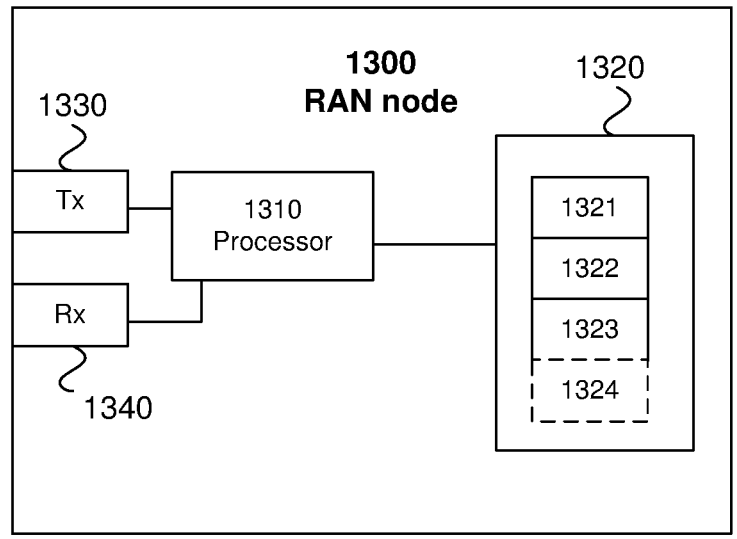
FIG. 13 illustrates another example embodiment of a RAN node such as an eNB.

With reference to FIG. 13, an alternative embodiment of a RAN node 1300 will be described. The RAN node 1300 may be an eNB. The RAN node 1300 is a RAN node of a radio communication network for communication with a gateway of a capillary network, wherein one or several communication devices are communicatively connectable to the RAN node 1300 via the gateway. The RAN node 1300 may comprise a processor 1310, various modules 1320, a transmitter (Tx) 1330 and a receiver (Rx) 1340. The transmitter 1330 and the receiver 1340 may alternatively be implemented as a single transceiver.

More particularly, the RAN node 1300 comprises an acquiring module 1321 for acquiring information related to a DRX configuration that is preferred by the gateway for the capillary network. Also, the RAN Node 1300 comprises a selection module 1322 for selecting, based on the acquired information, a DRX configuration to be applied by the RAN node 1300 to substantially match the preferred DRX configuration. Moreover, the RAN node 1300 comprises an application module 1323 for applying the selected DRX configuration. The transmitter 1330 is configured to transmit, i.e. send, a configuration message including the selected DRX configuration to the gateway for configuring the gateway accordingly.

In some embodiments, the receiver 1340 is configured to receive, from a CN node such as a MME, a message including the information related to the DRX configuration that is preferred by the gateway for the capillary network. Alternatively, or additionally, the receiver 130 may be configured to receive said message including the information related to the DRX configuration that is preferred by the gateway for the capillary network from the gateway. The acquiring module 1321 may thus receive said information from the receiver 1340.

Optionally, the RAN node 1300 may additionally comprise a compensation module 1324 for comparing a DRX configuration currently utilized by the RAN node with the DRX configuration that is preferred by the gateway for the capillary network in order to identify whether there is any mismatch between active time periods of the respective DRX configurations and for compensating for the identified mismatch in response to identifying a mismatch between the active time periods of the respective DRX configurations. In one embodiment, the compensation module 1324 is configured to compare a DRX configuration currently utilized by the RAN node with the DRX configuration that is preferred by the gateway for the capillary network in order to identify whether there is any mismatch in the overlap between active time periods of the respective DRX configurations; and in response to identifying a mismatch between the overlap of the active time periods of the respective DRX configurations check whether said overlap mismatch is equal to or above an overlap mismatch threshold value; and compensate for the identified mismatch when said overlap mismatch is equal to or above the overlap mismatch threshold value.

As described earlier, the information related to the DRX configuration that is preferred by the gateway for the capillary network comprises one or more of the following: information about the time length of the DRX cycle, information about the division into active and inactive periods of the DRX cycle.

Figure 14:
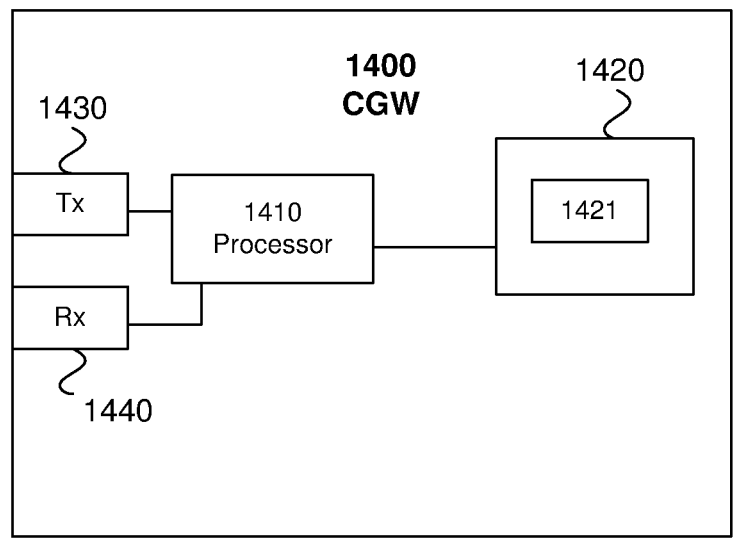
FIG. 14 illustrates another example embodiment of a gateway of a capillary network.

With reference to FIG. 14, an alternative embodiment of a gateway of a capillary network (hereinafter referred to as CGW) 1400 will be described. One or several communication devices are communicatively connectable to a RAN node of a radio communication network via the CGW 1400. The CGW 1400 may comprise a processor 1410, one ore more modules 1420, a transmitter (Tx) 1430 and a receiver (Rx) 1440. The transmitter 1430 and the receiver 1440 may alternatively be implemented in a single transceiver. The receiver 1440 is configured to receive (e.g. from the RAN node) a configuration message including a DRX configuration for configuring the CGW 1400 accordingly, wherein the DRX configuration substantially matches a DRX configuration which is preferred by the CGW 1400 for the capillary network. Also, the CGW 1400 comprises an application module for applying said DRX configuration.

The transmitter 1430 may be configured to transmit, to a network node of the radio communication network, a message including information related to a DRX configuration that is preferred by the CGW 1400 for the capillary network. The network node may be a SCS. Alternatively, the network node may be the RAN node, e.g. an eNB.

The various embodiments described in this disclosure suggest acquiring information related to a DRX configuration that is preferred by the gateway of the capillary network and selecting a DRX configuration, based on the acquired information, to be applied by the RAN node to substantially match the DRX configuration that is preferred by the gateway of the capillary network. The selected DRX configuration can be transmitted to the gateway such that the gateway can adapt, or configure, its DRX configuration accordingly. Also, the selected DRX configuration is applied, or utilized, by the RAN node. This way, the RAN node applies a DRX configuration that matches a DRX configuration that is preferred by the gateway for the capillary network. This may allow for a synchronization of the DRX configurations utilized on the capillary network interface by the gateway and on the cellular network radio interface by the gateway and the RAN node, respectively. Consequently, this may allow for a sufficient synchronization of the DRX configurations of the capillary network and a 3GPP network (e.g. LTE). This way, the two DRX configurations may be utilized in unison. This in turn enables a more efficient, and thus improved, usage of the DRX mechanism in capillary network scenarios.

In the detailed description hereinabove, for purposes of explanation and not limitation, specific details are set forth such as particular architectures, interfaces, techniques, etc. in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method performed by Radio Access Network, RAN, node of a radio communication network, wherein one or several communication devices are communicatively connectable to the RAN node via a gateway of a capillary network, the method comprising:
   acquiring information related to a Discontinuous Reception, DRX, configuration that is preferred by the gateway for a capillary network interface for communication from the gateway to the one or several communication devices in the capillary network;
   selecting, based on the acquired information, a DRX configuration for a radio interface for communication from the RAN node to the gateway in the radio communication network, the radio interface being of a different radio technology than the capillary network interface, the DRX configuration for the radio interface being selected to substantially match the DRX configuration that is preferred by the gateway for the capillary network interface;
transmitting a configuration message including the selected DRX configuration to the gateway for configuring the gateway accordingly; and
applying the selected DRX configuration to the RAN node.

2. The method according to claim 1, wherein acquiring information related to the DRX configuration that is preferred by the gateway for the capillary network interface comprises:
receiving a message including the information related to the DRX configuration that is preferred by the gateway for the capillary network interface from a Core Network, CN, node.

3. The method according to claim 2, wherein the CN node is a Mobility Management Entity, MME.

4. The method according to claim 1, wherein acquiring information related to the DRX configuration that is preferred by the gateway for the capillary network interface comprises:
receiving a message including the information related to the DRX configuration that is preferred by the gateway for the capillary network interface from the gateway.

5. The method according to claim 4, wherein the gateway is a Capillary Network Gateway, CGW.

6. The method according to claim 1, further comprising:
comparing a DRX configuration currently utilized by the RAN node with the DRX configuration that is preferred by the gateway for the capillary network interface in order to identify whether there is any mismatch between active time periods of the respective DRX configurations; and
in response to identifying a mismatch between the active time periods of the respective DRX configurations compensating for the identified mismatch.

7. The method according to claim 6, further comprising:
comparing a DRX configuration currently utilized by the RAN node with the DRX configuration that is preferred by the gateway for the capillary network interface in order to identify whether there is any mismatch in the overlap between active time periods of the respective DRX configurations;
in response to identifying a mismatch between the overlap of the active time periods of the respective DRX configurations checking whether said overlap mismatch is equal to or above an overlap mismatch threshold value; and
compensating for the identified mismatch when said overlap mismatch is equal to or above the overlap mismatch threshold value.

8. The method according to claim 1, wherein the information related to the DRX configuration that is preferred by the gateway for the capillary network interface comprises one or more of the following: information about the time length of the DRX cycle, information about the division into active and inactive periods of the DRX cycle.

9. The method according to claim 1, wherein the RAN node is an evolved NodeB, eNB.

10. The method of claim 1, wherein the capillary network interface is a local wireless radio interface and the radio interface is a cellular radio interface.

11. The method of claim 10, wherein the local wireless radio interface is an IEEE 802.15.4 interface, a Bluetooth interface, or an IEEE 802.11 interface.

12. The method of claim 10, wherein the cellular radio interface is a Third Generation Partnership Project, 3GPP, radio interface.

13. A method performed by a gateway of a capillary network, wherein one or several communication devices are communicatively connectable to a Radio Access Network, RAN, node of a radio communication network via the gateway, the method comprising:
receiving, from the RAN node, a configuration message including a Discontinuous Reception, DRX, configuration for a radio interface for communication from the RAN node to the gateway in the radio communication network for configuring the gateway accordingly, wherein the DRX configuration substantially matches a DRX configuration preferred by the gateway for a capillary network interface for communication from the gateway to the one or several communication devices in the capillary network, wherein the capillary network interface is of a different radio technology than the radio interface; and
applying the DRX configuration.

14. The method according to claim 13, further comprising transmitting, to a network node of the radio communication network, a message including information related to a DRX configuration that is preferred by the gateway for the capillary network interface.

15. The method according to claim 14, wherein the network node is a Services Capability Server, SCS.

16. The method according to claim 14, wherein the network node is the RAN node.

17. The method according to claim 16, wherein the RAN node is an evolved NodeB, eNB.

18. A Radio Access Network, RAN, node of a radio communication network for communication with a gateway of a capillary network, wherein one or several communication devices are communicatively connectable to the RAN node via the gateway, the RAN node comprising:
circuitry configured to acquire information related to a Discontinuous Reception, DRX, configuration that is preferred by the gateway for a capillary network interface for communication from the gateway to the one or several communication devices in the capillary network;
circuitry configured to select, based on the acquired information, a DRX configuration for a radio interface for communication from the RAN node to the gateway in the radio communication network, the radio interface being of a different radio technology than the capillary network interface, the DRX configuration for the radio interface being selected to substantially match the DRX configuration that is preferred by the gateway for the capillary network interface;
circuitry configured to transmit a configuration message including the selected DRX configuration to the gateway for configuring the gateway accordingly; and
circuitry configured to apply the selected DRX configuration to the RAN node.

19. The RAN node according to claim 18, wherein the circuitry configured to acquire information related to the DRX configuration that is preferred by the gateway for the capillary network interface is adapted to receive a message including said information related to the DRX configuration that is preferred by the gateway for the capillary network interface from a Core Network, CN, node.

20. The RAN node according to claim 19, wherein the CN node is a Mobility Management Entity, MME.

21. The RAN node according to claim 18, wherein the circuitry configured to acquire information related to the DRX configuration that is preferred by the gateway for the capillary network interface is adapted to receive a message including the information related to the DRX configuration that is preferred by the gateway for the capillary network interface from the gateway.

22. The RAN node according to claim 21, wherein the gateway is a Capillary Network Gateway, CGW.

23. The RAN node according to claim 18, comprising circuitry configured to compare a DRX configuration currently utilized by the RAN node with the DRX configuration that is preferred by the gateway for the capillary network interface in order to identify whether there is any mismatch between active time periods of the respective DRX configurations; and in response to identifying a mismatch between the active time periods of the respective DRX configurations to compensate for the identified mismatch.

24. The RAN node according to claim 23, comprising circuitry configured to compare a DRX configuration currently utilized by the RAN node with the DRX configuration that is preferred by the gateway for the capillary network interface in order to identify whether there is any mismatch in the overlap between active time periods of the respective DRX configurations; in response to identifying a mismatch between the overlap of the active time periods of the respective DRX configurations check whether said overlap mismatch is equal to or above an overlap mismatch threshold value; and compensate for the identified mismatch when said overlap mismatch is equal to or above the overlap mismatch threshold value.

25. The RAN node according to claim 18, wherein the information related to the DRX configuration that is preferred by the gateway for the capillary network interface comprises one or more of the following: information about the time length of the DRX cycle, information about the division into active and inactive periods of the DRX cycle.

26. The RAN node according to claim 18, wherein the RAN node is an evolved NodeB, eNB.

27. A gateway of a capillary network for communication with a Radio Access Network, RAN, node of a radio communication network, wherein one or several communication devices are communicatively connectable to the RAN node of a radio communication network via the gateway, the gateway comprising:
 circuitry configured to receive, from the RAN node, a configuration message including a Discontinuous Reception, DRX, configuration for a radio interface for communication from the RAN node to the gateway in the radio communication network for configuring the gateway accordingly, wherein the DRX configuration substantially matches a DRX configuration preferred by the gateway for a capillary network interface for communication from the gateway to the one or several communication devices in the capillary network, wherein the capillary network interface is of a different radio technology than the radio interface; and
 circuitry configured to apply the DRX configuration.

28. The gateway according to claim 27, further comprising circuitry configured to transmit, to a network node of the radio communication network, a message including information related to a DRX configuration that is preferred by the gateway for the capillary network interface.

29. The gateway according to claim 28, wherein the network node is a Services Capability Server, SCS.

30. The gateway according to claim 28, wherein the network node is the RAN node.

31. The gateway according to claim 30, wherein the RAN node is an evolved NodeB, eNB.

* * * * *